(12) United States Patent
Cho et al.

(10) Patent No.: US 12,715,785 B2
(45) Date of Patent: Aug. 25, 2026

(54) FILTER ASSEMBLY

(71) Applicant: SAMSUNG ELECTRONICS CO., LTD., Suwon-si (KR)

(72) Inventors: Yeonwoo Cho, Suwon-si (KR); Wanku Kang, Suwon-si (KR); Jungha Park, Suwon-si (KR); Junggeun Lee, Suwon-si (KR); Jongho Lee, Suwon-si (KR); Youngdon Jeong, Suwon-si (KR); Sunghyun Kim, Suwon-si (KR); Doyun Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 697 days.

(21) Appl. No.: 17/887,555

(22) Filed: Aug. 15, 2022

(65) Prior Publication Data

US 2022/0388867 A1 Dec. 8, 2022

Related U.S. Application Data

(63) Continuation of application No. PCT/KR2021/095021, filed on Jan. 20, 2021.

(30) Foreign Application Priority Data

Mar. 10, 2020 (KR) ........................ 10-2020-0029320
Sep. 23, 2020 (KR) ........................ 10-2020-0122769

(51) Int. Cl.
*C02F 1/00* (2023.01)
*B01D 29/52* (2006.01)
(Continued)

(52) U.S. Cl.
CPC .............. *C02F 1/001* (2013.01); *B01D 29/52* (2013.01); *B01D 29/56* (2013.01); *B01D 35/153* (2013.01);
(Continued)

(58) Field of Classification Search
CPC .... C02F 1/001; C02F 1/003; C02F 2201/005; C02F 2201/006; C02F 2307/10; B01D 35/306; B01D 29/52; B01D 29/56
See application file for complete search history.

(56) References Cited

U.S. PATENT DOCUMENTS

2010/0163477 A1 7/2010 Noh et al.

FOREIGN PATENT DOCUMENTS

CN 209411943 U 9/2019
CN 209438387 U 9/2019
(Continued)

OTHER PUBLICATIONS

KR 101409451 and the English translation (Year: 2014).*
(Continued)

*Primary Examiner* — Benjamin M Kurtz
(74) *Attorney, Agent, or Firm* — STAAS & HALSEY LLP

(57) ABSTRACT

A filter assembly comprises an outer casing, filters and a pipe member connected to first, second and third filters and comprising an inlet flow path and an outlet flow path. The inlet flow path comprises a first inlet flow path connected to the first filter, a second inlet flow path connected to the second filter, a third inlet flow path connected to the third filter, and an inflow member comprising a branch point to allow water to flow in parallel through the first inlet flow path and the second inlet flow path. The outlet flow path comprises a first outlet flow path for water to be discharged from the first filter, and a second outlet flow path for water to be discharged from the second filter. Water discharged from the first outlet flow path from the second outlet flow path is guided and introduced into the third inlet flow path.

14 Claims, 22 Drawing Sheets

(51) Int. Cl.

| | |
|---|---|
| ***B01D 29/56*** | (2006.01) |
| ***B01D 35/153*** | (2006.01) |
| ***B01D 35/16*** | (2006.01) |
| ***B01D 35/30*** | (2006.01) |

(52) U.S. Cl.

CPC .......... *B01D 35/16* (2013.01); *B01D 35/306* (2013.01); *C02F 1/006* (2013.01); *B01D 2201/167* (2013.01); *B01D 2201/4007* (2013.01); *C02F 2201/005* (2013.01); *F25D 2323/121* (2013.01)

(56) References Cited

FOREIGN PATENT DOCUMENTS

| | | | | | |
|---|---|---|---|---|---|
| EP | 3 257 821 | A1 | | 12/2017 | |
| JP | 2007-289888 | | | 11/2007 | |
| JP | 2007-289888 | A | † | 11/2007 | |
| KR | 20-1996-0038198 | U | | 12/1996 | |
| KR | 1998-069529 | A | | 10/1998 | |
| KR | 200439241 | Y1 | * | 3/2008 | ......... B01D 35/1435 |
| KR | 10-2008-0064558 | A | | 7/2008 | |
| KR | 10-2014-0043623 | A | | 4/2014 | |
| KR | 10-1591007 | B1 | | 2/2016 | |
| KR | 10-1780168 | B1 | | 9/2017 | |
| KR | 10-1954760 | B1 | | 3/2019 | |

OTHER PUBLICATIONS

English Translation of KR 200439241 (Year: 2008).*

Extended European Search Report dated May 30, 2023 in European Patent Application No. 21768865.4.

International Search Report issued in International Application No. PCT/KR2021/095021 dated May 6, 2021.

Office Action dated Apr. 9, 2025 issued in European Application No. 21 768 865.4.

Korean Office Action issued Aug. 18, 2025 for Application No. 10-2020-0122769.

* cited by examiner
† cited by third party

FILTER ASSEMBLY

CROSS-REFERENCE TO RELATED APPLICATIONS

This application is a continuation application, under 35 U.S.C. § 111(a), of International Patent Application No. PCT/KR2021/095021, filed on Jan. 20, 2021, which claims the benefit of Korean Patent Application No. 10-2020-0029320, filed Mar. 10, 2020, and Korean Patent Application No. 10-2020-0122769, filed Sep. 23, 2020, in the Korean Intellectual Property Office, the entire disclosures of each of which are incorporated herein by reference as a part of this application.

BACKGROUND

Field

The present disclosure relates to a filter assembly, and more particularly, to a filter assembly including an improved assemblability.

Description of Related Art

In general, a water purifier is a device that filters introduced water by using at least one purification filter so as to supply clean water to a user. The water purifier may apply a plurality of filters to implement the purification performance. In this case, filters are mainly arranged in a row to allow purified water to flow toward a certain direction.

A conventional water purifier may include a filter member for purifying raw water by a filter, a filter pipe member and a mounting member for dividing purified water, and an inner casing and an outer casing for fixing the filter pipe member and the mounting member.

Recently, various types of filters have been applied in line with the trend of improving the performance of purification filters due to the microplastics and environmental pollution. In addition, the demand for a compact filter arrangement as well as the water purification performance has increased.

SUMMARY

One aspect of the present disclosure provides a filter assembly including an outer casing forming an exterior, a plurality of filters to be accommodated in the outer casing, and including a first filter, a second filter, and a third filter, and a pipe member to be connected to the first filter, the second filter, and the third filter and including an inlet flow path and an outlet flow path. The inlet flow path includes a first inlet flow path which while connected to the first filter allows water to be introduced into the first filter, a second inlet flow path which while connected to the second filter allows water to be introduced into the second filter, a third inlet flow path which while connected to the third filter allows water to be introduced into the third filter, and an inflow member including a branch point to allow water to flow in parallel through the first inlet flow path and the second inlet flow path which are parallel to each other. The outlet flow path includes a first outlet flow path which while connected to the first filter allows water to be discharged from the first filter, and a second outlet flow path which while connected to the second filter allows water to be discharged from the second filter. Water discharged from the first outlet flow path is guided with water discharged from the second outlet flow path and introduced into the third inlet flow path.

The pipe member may further include a connection pipe to connect the first filter, the second filter, and the third filter.

The connection pipe may further include a plurality of confluence inlet pipes formed to extend between the second filter and the third filter to connect the first outlet flow path and the second outlet flow path.

The connection pipe may further include a confluence outlet pipe arranged among the plurality of confluence inlet pipes to discharge water that is guided in the plurality of confluence inlet pipes.

The connection pipe may further include an inclined pipe formed to extend to have an inclination between the confluence outlet pipe and the third filter.

The plurality of filters may further include a fourth filter, and the pipe member may further include a third outlet flow path to be connected to the third filter to move water discharged from the third filter.

The pipe member may further include a fourth outlet flow path to be connected to the fourth filter to move water discharged from the fourth filter.

Each of the first filter, the second filter and the third filter may further include a plurality of check valves provided to prevent water leakage, an inlet provided to guide water introduced to a filter member, and an outlet provided to guide water discharged from the filter member. The plurality of check valves may include a first check valve and a second check valve. The first check valve may be arranged in the inlet, and the second check valve may be arranged in the outlet.

The first filter and the second filter may include a composite filter of the same type.

The filter assembly may further include a mounting member coupleable to one end of the first filter, the second filter, and the third filter, and a door bracket provided to cover another end of the first filter, the second filter, and the third filter. The first filter, the second filter, and the third filter may be covered by the door bracket in a position in which the first filter, the second filter, and the third filter are coupled to the mounting member.

The door bracket may include a door block formed to protrude from a wall of the door bracket provided to cover the other end of the first filter, the second filter, and the third filter, so as to face the other end of at least one of the first filter, the second filter, and the third filter in the position.

The filter assembly may further include an inner casing arranged outside the first filter, the second filter, and the third filter to fix the first filter, the second filter, and the third filter, a residual water hole arranged on the inner casing to discharge residual water flowing from at least one of the first filter, the second filter, and the third filter or the mounting member, and a water collecting tray arranged under the inner casing to collect water discharged through the residual water hole. The water collecting tray may include a guide groove formed in a position corresponding to the door block to allow the door block to guide withdrawal of the water collecting tray.

Another aspect of the present disclosure provides a filter assembly including a first filter and a second filter arranged along a first direction, a third filter arranged in a second direction perpendicular to the first direction with respect to the first filter, and a pipe member to be connected to the first filter, the second filter, and the third filter. The pipe member includes a first outlet flow path to be connected to the first filter and formed to extend along the second direction to guide water discharged from the first filter, a second outlet flow path to be connected to the second filter and formed to extend along the second direction so as to guide water discharged from the second filter, at least one confluence inlet pipe formed to extend along the first direction between the second filter and the third filter to connect the first outlet flow path and the second outlet flow path, a confluence outlet pipe through which water guided in the at least one confluence inlet pipe is discharged, and a third inlet flow path formed to extend along the second direction between a confluence inlet pipe and the third filter to guide water introduced into the third filter.

The filter assembly may further include a fourth filter arranged in the second direction with respect to the first filter. The pipe member may further include a plurality of link pipes formed to extend along a third direction perpendicular to the first direction and the second direction between the third filter and the fourth filter, so as to guide water discharged from the third filter toward the fourth filter.

The pipe member may include a third outlet flow path connected to the plurality of link pipes and formed to extend along the first direction so as to guide the water discharged from the third filter.

Another aspect of the present disclosure provides a filter assembly including a first filter and a second filter arranged in a first direction, a third filter arranged in a second direction perpendicular to the first direction with respect to the first filter, and a pipe member connected to the first filter, the second filter, and the third filter. The pipe member includes a first outlet flow path connected to the first filter and formed to extend a third direction perpendicular to the first direction and the second direction so as to guide water discharged from the first filter, a second outlet flow path connected to the second filter and formed to extend along the third direction so as to guide water discharged from the second filter, a plurality of confluence inlet pipes formed to extend along the first direction between the first filter and the second filter to connect the first outlet flow path and the second outlet flow path, a confluence outlet pipe arranged among the plurality of confluence inlet pipes to discharge water that is joined in the plurality of confluence inlet pipes, and a third inlet flow path formed to extend along the third direction between the confluence inlet pipe and the third filter so as to guide water introduced into the third filter.

The pipe member may include a bent pipe formed to extend to be bent from the first direction to the second direction between the confluence outlet pipe and the third filter so as to guide the water discharged from the confluence outlet pipe to the third filter.

Another aspect of the present disclosure provides a filter assembly including an outer casing including an opening, a filter to be arranged inside the outer casing and including a protrusion member formed to protrude from one end of the filter, an inlet formed on another side of the filter and into which water is introduced, and an outlet formed on the other side of the filter and from which water is discharged, a mounting member to be coupleable to the inlet and the outlet of the filter in a position, and a door bracket rotatably coupled to open and close the opening of the outer casing. The door bracket comprises a door block protruding from an inner surface of the door bracket. In response to the filter being coupleable to the mounting member in the first position, the door bracket closes the opening of the outer casing, and the door block faces a side surface of the protruding member.

While the filter is coupled the mounting member in a second position different from the first position, the door bracket may not close the opening of the outer casing.

The door block may be provided in plurality. The plurality of door blocks may include a first block formed to extend along a first direction and a second block spaced apart from the first block and formed to extend along the first direction. The door bracket may include a seating member formed in a space between the first block and the second block and on which the protrusion member is seated.

The filter assembly may further include an inner casing arranged between the outer casing and an outside of the filter, a residual water hole provided in the inner casing to discharge residual water discharged from at least one of the filter or the mounting member, and a water collecting tray arranged under the inner casing to collect the water discharged through the residual water hole. The water collecting tray may include a guide groove formed on a lower surface of the water collecting tray to correspond to the door block so as to allow the door block to guide withdrawal of the water collecting tray.

The door block may include a plurality of rails guiding the withdrawal of the water collecting tray. The plurality of rails may include a first rail provided in a lower portion of the door bracket to be adjacent to the water collecting tray, a second rail formed to be inclined upwardly from an upper portion of the first rail, and a third rail to be connected to the second rail in an upper portion of the second rail and formed to be higher than the first rail.

DETAILED DESCRIPTION

Figure 1:
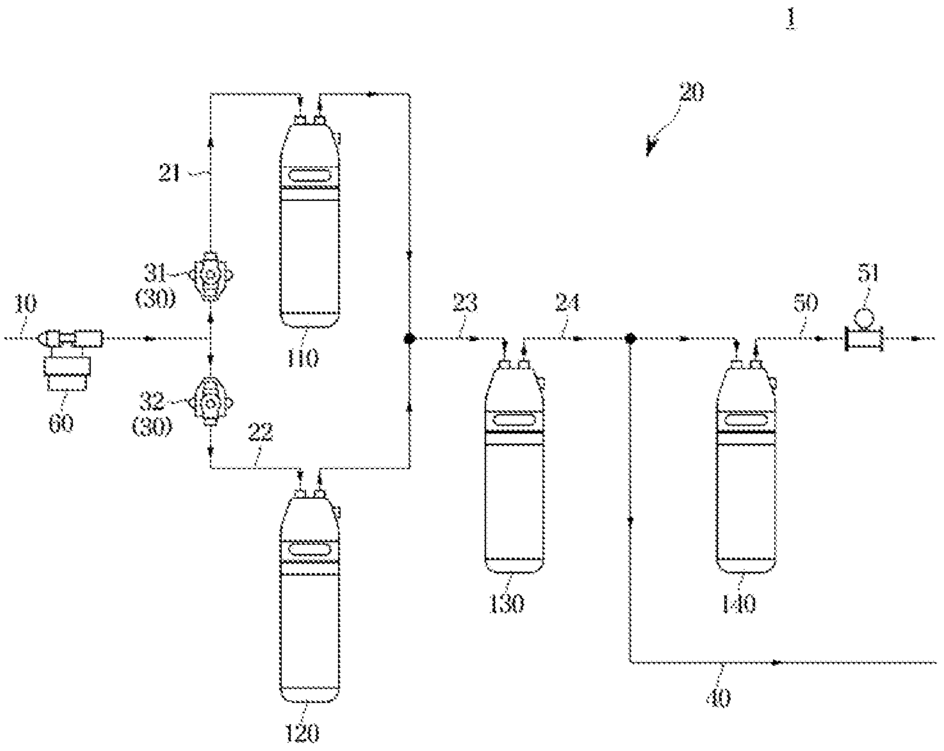
FIG. 1 is a flow diagram illustrating a filter assembly according to one embodiment of the present disclosure.

Embodiments described in the disclosure and configurations shown in the drawings are merely examples of the embodiments of the disclosure, and may be modified in various different ways at the time of filing of the present application to replace the embodiments and drawings of the disclosure.

In addition, the same reference numerals or signs shown in the drawings of the disclosure indicate elements or components performing substantially the same function.

Also, the terms used herein are used to describe the embodiments and are not intended to limit and/or restrict the disclosure. The singular forms "a," "an" and "the" are intended to include the plural forms as well, unless the context clearly indicates otherwise. In this disclosure, the terms "including", "having", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, but elements are not limited by these terms. These terms are only used to distinguish one element from another element. For example, without departing from the scope of the disclosure, a first element may be termed as a second element, and a second element may be termed as a first element. The term of "and/or" includes a plurality of combinations of relevant items or any one item among a plurality of relevant items.

In the following detailed description, the terms of "up and down direction", "lower", "front and rear direction" and the like may be defined by the drawings, but the shape and the location of the component is not limited by the term.

The present disclosure is directed to providing a filter assembly capable of increasing a space efficiency of a filter arrangement.

Further, the present disclosure is directed to providing a filter assembly capable of improving an assemblability.

Further, the present disclosure is directed to providing a filter assembly capable of reducing a flow path resistance by reducing a length of a pipe member.

Further, the present disclosure is directed to providing a filter assembly capable of easily changing a filter and capable of minimizing a size thereof.

A filter assembly may minimize a flow path resistance because a space efficiency of a filter arrangement is maximized and an assemblability of a head is increased.

A filter assembly may be provided such that a filter is compactly arranged.

A filter assembly may prevent an incorrect coupling.

Hereinafter exemplary embodiments of the present disclosure will be described in detail with reference to the accompanying drawings.

FIG. 1 is a flow diagram illustrating a filter assembly according to one embodiment of the present disclosure.

Referring to FIG. 1, a filter assembly 1 may include a plurality of filters 100. The plurality of filters 100 may include a first filter 110, a second filter 120, a third filter 130, and a fourth filter 140. Some of the components may be omitted.

The filter assembly 1 may include a purified water flow path 20 connected to a raw water flow path 10 to purify raw water. The filter assembly may include a plurality of pre-processing filters arranged on the purified water flow path 20 to filter raw water. The plurality of pre-processing filters may include the first filter 110 and the second filter 120.

The pre-processing filter may include a pre-carbon filter, a sediment filter, a high turbidity filter, and a composite filter in which a sediment filter and a pre-carbon filter are combined. Because a composite filter is available, the pre-processing filter may remove chlorine, organic compounds, odors and pigments through the adsorption while removing large foreign substances. In a state in which the same type of the plurality of filters is used, a replacement cycle of the filters may be the same, and thus it is possible to easily replace the filters. In addition, the pre-processing filter may include a Granular Activated Carbon (GAC) filter, a block carbon filter, and a filter that is formed by performing a high heat treatment on coconut. Some of the components may be omitted.

The drawings illustrates that the pre-processing filter is provided with two filters, but is not limited thereto. Therefore, the filter assembly may include three or more pre-processing filters.

According to various embodiments, the filter may be a combination of one or more of the various filters described above. In addition, the filter according to the embodiment of the present disclosure is not limited to the above-described filters, and may include a new filter according to technological development.

The first filter 110 and the second filter 120 may be arranged in parallel. The purified water discharged from the first filter 110 and the second filter 120 may flow to the third filter 130 and the fourth filter 140 connected in series.

By using the plurality of pre-processing filters in parallel, a pressure of the discharged water may be increased. When the same type of filter is used, a water treatment capacity is halved and a lifetime of the filter is increased. Accordingly, the inconvenience due to the filter replacement may be minimized and the user convenience may be increased.

The third filter 130 may include a water-permeable membrane filter as a purification filter. The fourth filter 140 may include a post-carbon filter as a post-processing filter. Some of the components may be omitted.

Particularly, the third filter 130 may include one of an ultrafiltration membrane, a nanofiltration membrane, and a reverse osmosis membrane.

More particularly, the ultrafiltration membrane may include micropores having a pore diameter of greater than or equal to 0.005 micrometers, but less than or equal to 0.5 micrometers. The nanofiltration membrane may include micropores having a pore diameter of greater than or equal to 0.001 micrometers, but less than or equal to 0.005 micrometers. The reverse osmosis membrane may include micropores having a pore diameter of greater than or equal to 0.0001 micrometers, but less than or equal to 0.001 micrometers.

The fourth filter may improve the taste of water by adsorbing fine substances and removing gas components and odors. The fourth filter may include a granular activated carbon (GAC) filter, a block carbon filter, a silver carbon filter, a deIonization resin (DI Resin) filter, and a taste chlorine reduction (TCR) filter. Some of the components may be omitted.

The third filter 130 and the fourth filter 140 may include a composite filter in which a membrane filter and a post-processing filter are combined.

According to various embodiments, the filter may be a combination of one or more of the various filters described above. In addition, the filter according to the embodiment of the present disclosure is not limited to the above-described filters, and may include a new filter according to technological development.

The purified water flow path 20 may be divided into a plurality of flow paths from the raw water flow path 10. That is, the purified water flow path 20 may be a plurality of branch flow paths. The purified water flow path 20 may include a first purified water flow path 21, a second purified water flow path 22, a third purified water flow path 23, and a fourth purified water flow path 24. Some of the components may be omitted.

The first purified water flow path 21 may be connected to the raw water flow path 10 and formed on an upstream side of the first filter 110. The second purified water flow path 22 may be connected to the raw water flow path 10 and formed on an upstream side of the second filter 120. The third purified water flow path 23 may be formed from a connection point between the downstream of the first filter 110 and the downstream of the second filter 120, to an upstream of the third filter 130. The fourth purified water flow path 24 may be connected to the third filter 130 and formed up to a connection point between a drain flow path 40 and the purified water flow path 20.

The purified water flow path 20 may include a plurality of inlet valves 30 configured to open and close the flow path to allow the raw water to move or not move to the purified water flow path 20. The plurality of inlet valves 30 may be installed on the upstream side of the plurality of pre-processing filters with respect to the direction in which water flows, so as to control the opening and closing of the purified water flow path. Some of the components may be omitted.

The plurality of inlet valves 31 and 32 may include a first inlet valve 31 and a second inlet valve 32. The first inlet valve 31 may be installed on the upstream side of the first filter 110 to control the opening and closing of the first purified water flow path 21. The second inlet valve 32 may be installed on the upstream side of the second filter 120 to control the opening and closing of the second purified water flow path 22. Some of the components may be omitted.

The filter assembly 1 may include the drain flow path 40 separately formed by branching from the middle of the purified water flow path, and through which the purified water, flowing through the purification filter, is discharged so as to reduce a flow resistance on the purified water flow path 20. In addition, the filter assembly 1 may include an outlet flow path 50 in which the purified water flowing through the post-processing filter is supplied to a user. Some of the components may be omitted.

A pressure reducing valve 60 configured to reduce a pressure of raw water may be provided in the raw water flow path 10.

The outlet flow path 50 may further include a flow meter 51 configured to measure an amount of purified water. The amount of purified water of the filter assembly may be measured based on a flow rate measured by the flow meter 51. Accordingly, it is possible to identify an appropriate replacement time of each filter.

Figure 2:
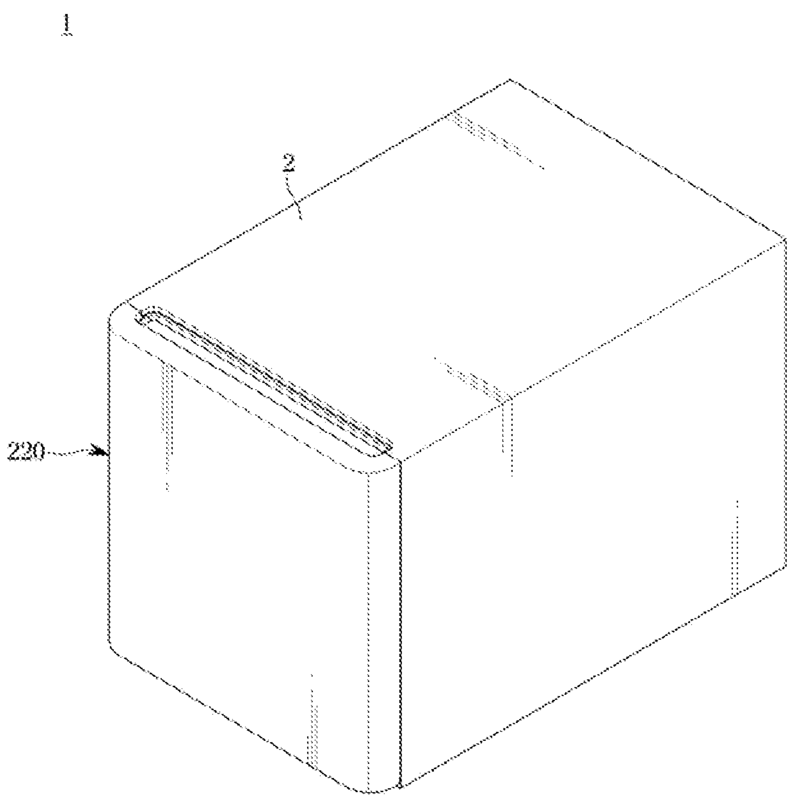
FIG. 2 is a view illustrating an outer casing of the filter assembly shown in FIG. 1 according to an embodiment of the present disclosure.
Figure 3:
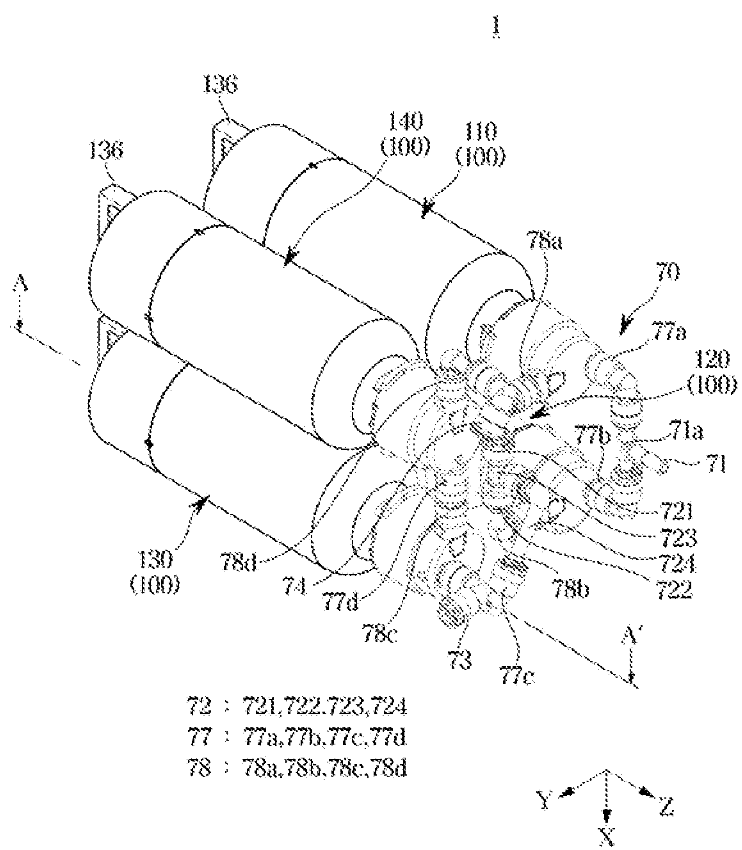
FIG. 3 is a view illustrating the filter assembly shown in FIG. 1 according to an embodiment of the present disclosure.
Figure 4:
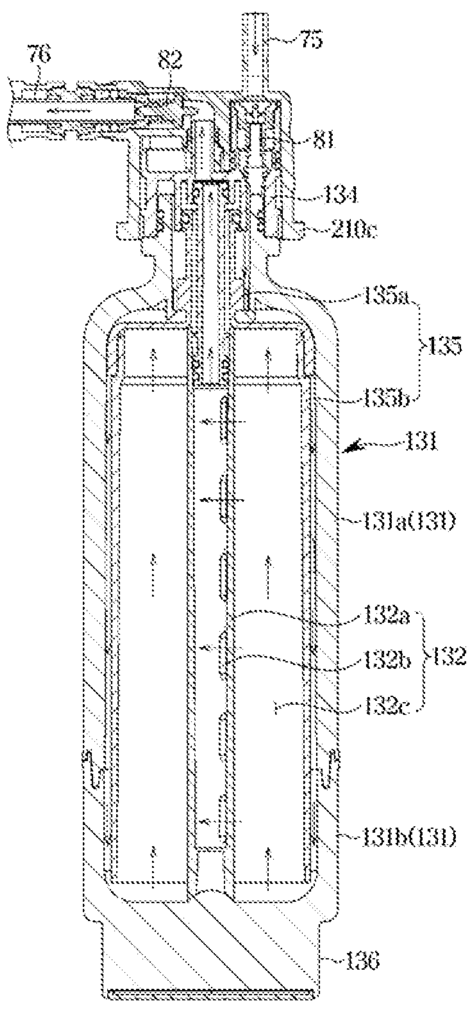
FIG. 4 is a cross-sectional view taken along line A-A' of a filter of the filter assembly according to one embodiment shown in FIG. 3 according to an embodiment of the present disclosure.
Figure 5:
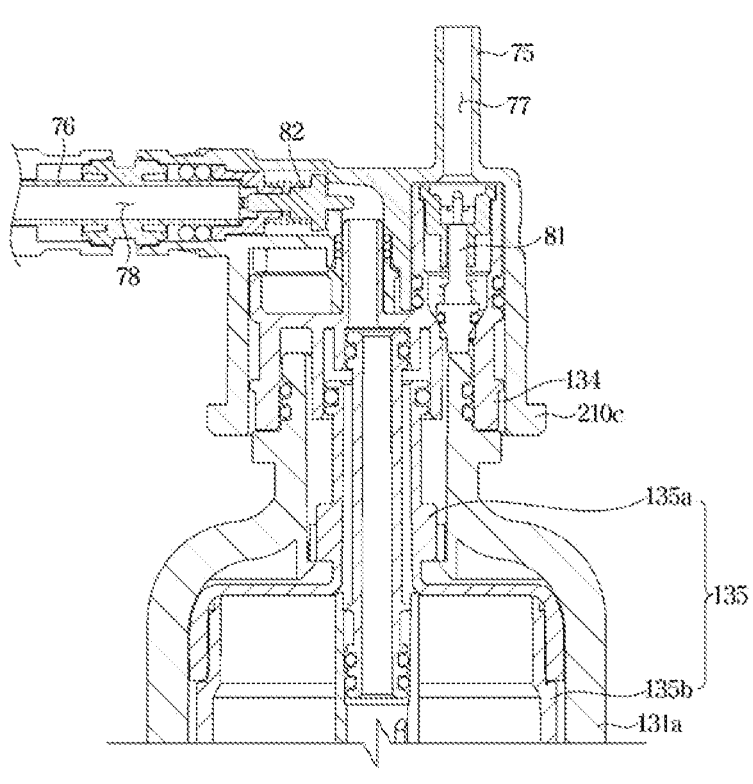
FIG. 5 is an enlarged-view illustrating an upper portion of the cross-section taken along line A-A' of the filter of the filter assembly according to one embodiment shown in FIG. 4.

FIG. 2 is a view illustrating an outer casing of the filter assembly shown in FIG. 1. FIG. 3 is a view illustrating a filter arrangement of the filter assembly shown in FIG. 1. FIG. 4 is a cross-sectional view taken along line A-A' of a filter of the filter assembly according to one embodiment shown in FIG. 3. FIG. 5 is an enlarged view illustrating an upper portion of the cross-section taken along line A-A' of the filter of the filter assembly according to one embodiment shown in FIG. 4.

Referring to FIGS. 2 to 5, the filter assembly 1 may include an outer casing 2 accommodating the plurality of filters 100. In addition, the filter assembly 1 may include a door bracket 220 rotatably coupled to the outer casing 2.

The filter assembly 1 may include a pipe member 70. The pipe member 70 may include an inlet flow path 77 and an outlet flow path 78.

The inlet flow path 77 may include a first inlet flow path **77*a*, a second inlet flow path 77*b*, a third inlet flow path 77*c*, and a fourth inlet flow path 77*d*. The outlet flow path 78 may include a first outlet flow path 78*a*, a second outlet flow path 78*b*, a third outlet flow path 78*c*, and a fourth outlet flow path 78*d***.

The pipe member 70 may include an inflow member 71. The inflow member 71 may extend in a third direction Z to allow water to be introduced into the first filter 110 and the second filter 120. An extending direction of the inflow member 71 is not limited to the above example. The inflow member 71 may include a branch point **71*a* to allow water to be introduced in parallel into the first inlet flow path 77*a* and the second inlet flow path 77*b*. That is, the inflow member 71 may be branched and connected to the first inlet flow path 77*a* and the second inlet flow path 77*b* so as to allow the water to be introduced in parallel into the plurality of pre-processing filters. The branch point 71*a* may be arranged between the first inlet flow path 77*a* and the second inlet flow path 77*b***.

In order to guide water, which is introduced to the first filter 110, the first inlet flow path **77*a* may extend in a first direction X, through which the water passing through the inflow member 71 flows, and be bent and extend in the third direction Z. In order to guide water, which is introduced to the second filter 120, the second inlet flow path 77*b* may extend in the first direction X, through which the water passing through the inflow member 71 flows, and be bent and extend in the third direction Z. In order to guide water introduced to the third filter 130, the third inlet flow path 77*c* may be connected to an inclined pipe 724** and the third filter 130. In order to guide water introduced to the fourth filter 140, the fourth inlet flow path 77*d* may be connected to the third outlet flow path 78*c* and extend in the first direction X.

In order to guide water discharged from the first filter 110, the first outlet flow path 78*a* may be connected to the first filter 110 and extend in a second direction Y. In order to guide water discharged from the second filter 120, the second outlet flow path 78*b* may be connected to the second filter 120 and extend in the second direction Y. In order to guide water discharged from the third filter 130, the third outlet flow path 78*c* may be connected to the third filter 130 and extend in the first direction X. In order to guide water discharged from the fourth filter 140, the fourth outlet flow path 78*d* may be connected to the fourth filter 140 and extend in the first direction X.

In addition, the fourth outlet flow path 78*d* may extend to be bent in the third direction Z to allow the discharged water to flow toward an outlet member 74.

The pipe member 70 may further include a connection pipe 72. The connection pipe 72 may include a plurality of confluence inlet pipes 721 and 722, a confluence outlet pipe 723, and the inclined pipe 724.

The confluence inlet pipes 721 and 722 may extend in the first direction X between the second filter 120 and the third filter 130 to connect the first outlet flow path 78*a* and the second outlet flow path 78*b*. The plurality of confluence inlet pipes 721 and 722 may include a first confluence inlet pipe 721 and a second confluence inlet pipe 722.

The first confluence inlet pipe 721 may extend in the first direction X to guide the water discharged from the first outlet flow path 78*a*, and the water discharged from the first outlet flow path 78*a* may flow in connection with the confluence outlet pipe 723. The second confluence inlet pipe 722 may extend in the first direction X to guide the water discharged from the second outlet flow path 78*b*, and the water discharged from the second outlet flow path 78*b* may flow in connection with the confluence outlet pipe 723. The confluence outlet pipe 723 may be connected to the confluence inlet pipes 721 and 722, and the water may flow through the inclined pipe 724.

The inclined pipe 724 may extend to have an inclination between the confluence outlet pipe 723 and the third filter 130. Water discharged from the confluence outlet pipe 723 may be introduced into the third filter 130 through the inclined pipe 724. That is, the inclined pipe 724 may be connected to the third inlet flow path 77*c*. Some of the components may be omitted.

By the above configuration, the filter may be compactly arranged in the filter assembly, the resistance of the pipe member 70 may be reduced, and the pressure of the discharged water may be increased.

A drain member 73 may be used to discharge removed water, in which contaminants are concentrated, other than the water that is purified.

The plurality of filters 100 may include a housing 131, a filter member 132, a receiving member 134, and a handle 136, respectively. FIGS. 2 and 3 will be described with reference to the third filter 130.

A mounting member 210*c* may be coupled to one end of the housing 131.

The housing 131 may include an upper housing 131*a* and a lower housing 131*b*.

The plurality of filters 100 may include an inlet 75 through which water is introduced into the filter member 132 in each filter, and an outlet 76 through which water, which is filtered in each filter, is discharged. Some of the components may be omitted.

The inlet 75 of the first filter 110, the second filter 120 and the third filter 130 may be formed to allow water to be introduced into a longitudinal direction of the filter, and the outlet 76 may be formed to allow water to be discharged into a direction perpendicular to the longitudinal direction of the filter. However, the present disclosure is not limited thereto.

The filter member 132 of the filter may include a discharge pipe 132*a* through which the purified water is discharged, a through-hole 132*b* through which the purified water flows into the discharge pipe, and a cylindrical filter body 132*c* provided to filter raw water and including a hollow member.

Water may be introduced into the inlet flow path 77 through the inlet 75, and the water may be filtered by the filter member 132 and then discharged to the outlet 76 through the outlet flow path 78. The drain member 73 is not shown in the drawing, but the drain member 73 may be included in the third filter 130.

Each filter may include a filter case 135 provided on the outside of the filter body.

The filter case 135 may include an upper case 135*a* and a lower case 135*b*. The filter case 135 may cover an outer peripheral surface and an upper end of the filter body 132*c* to block the flow of the fluid. Accordingly, the filter case 135 may prevent the purified water from flowing out to the outer circumferential surface or the upper end, thereby minimizing the purified water loss.

A center line of the discharge pipe 132*a* may be provided to be perpendicular to a bottom surface of the filter housing 131. However, the present disclosure is not limited thereto.

A handle 136 may be provided at a lower portion of the housing 131 to allow each filter to be mounted or detached from the filter assembly. The handle 136 may be a protruding member 136 mounted on a seating member 226 formed between door blocks 224 to be described later.

The filter assembly may further include a check valve 80. The check valve 80 may include a first check valve 81 and a second check valve 82. The first check valve 81 may be arranged in the inlet 75. The second check valve 82 may be arranged in the outlet 76. The check valves 81 and 82 may prevent water from flowing back into the filter. In addition, each check valve 81 and 82 may prevent water from leaking into the inlet 75 and the outlet 76 even when the filter is removed. Because the first check valve 81 moves in a direction opposite to a direction, in which the water is introduced, upon opening the flow path, the first check valve 81 may block the inlet 75 and the inlet flow path 77 to prevent the leakage. Because the second check valve 82 moves in a direction opposite to a direction, in which the water is discharged, upon opening the flow path, the second check valve 82 may block the outlet 76 and the outlet flow path 78 to prevent the leakage.

As for the filter assembly, a pressure reducing valve (not shown) configured to reduce the pressure of raw water may be provided on the upstream side of the pre-processing filter. In addition, the filter assembly may further include at least one pump (not shown). The pump may pump the purified water discharged from the at least one pre-processing filter to flow to the third filter 130 and the fourth filter 140.

In the filter assembly according to the embodiment of the present disclosure, filters may be provided in a refrigerator, and particularly, may be arranged inside the refrigerator to allow purified water to be supplied from a refrigerator dispenser. However, the present disclosure is not limited thereto and may be arranged outside the refrigerator to supply the purified water.

Figure 6:
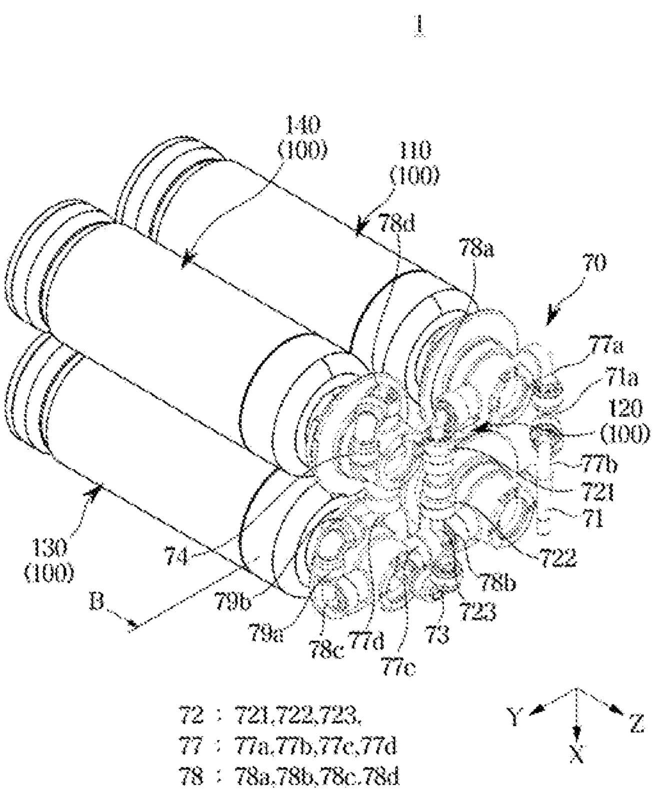
FIG. 6 is a view illustrating a filter assembly according to another embodiment of the present disclosure.
Figure 7:
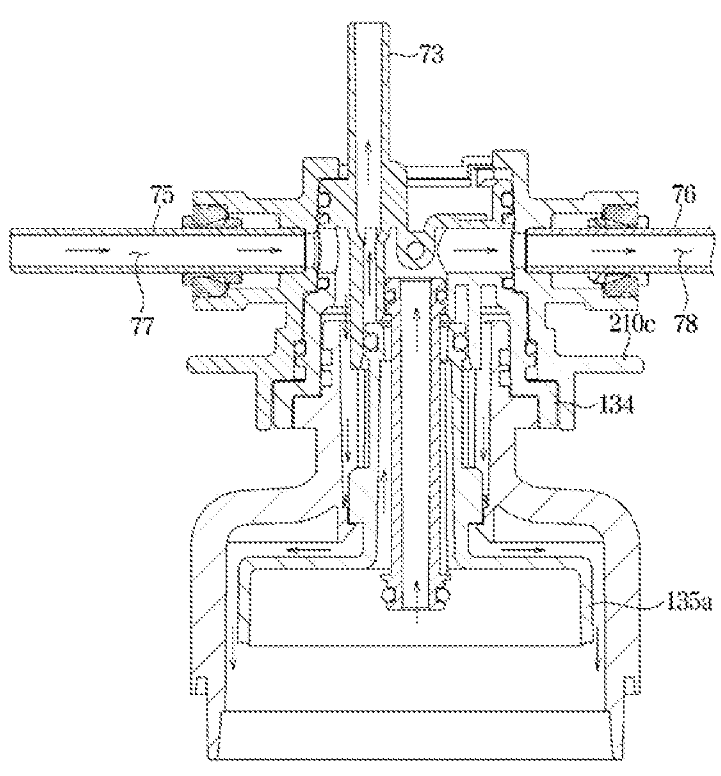
FIG. 7 is a cross-sectional view taken along line B of a third filter of the filter assembly according to another embodiment shown in FIG. 6.

FIG. 6 is a view illustrating a filter assembly according to another embodiment of the present disclosure. FIG. 7 is a cross-sectional view taken along line B of a third filter of the filter assembly according to another embodiment shown in FIG. 6.

A basic configuration of the filter assembly and the filter is described above with reference to FIGS. 1 to 5, and thus the same description will be omitted and only differences will be described.

Referring to FIGS. 6 and 7, an inlet 75 and an outlet 76 of each filter may be provided in a direction perpendicular to the longitudinal direction of the filter.

A pipe member 70 may include an inflow member 71. The inflow member 71 may extend to allow water to be introduced into the first filter 110 and the second filter 120. That is, the inflow member 71 may be branched and connected to a first inlet flow path 77*a* and a second inlet flow path 77*b* so as to allow water to be introduced in parallel into the plurality of pre-processing filters.

The first inlet flow path 77*a* may extend to guide the water introduced into the first filter 110. The first inlet flow path 77*a* may extend in the first direction X to allow the water passing through the inflow member 71 to flow. The second inlet flow path 77*b* may extend to guide the water introduced into the second filter 120. The second inlet flow path 77*b* may extend in the first direction X to allow the water passing through the inflow member 71 to flow. The third inlet flow path 77*c* may be connected to the confluence inlet pipes 721 and 722 and the third filter 130 to guide the water introduced into the third filter 130. The fourth inlet flow path 77*d* may be connected to the third outlet flow path 78*c* and connected to a link pipe 79 to guide the water introduced into the fourth filter 140.

The first outlet flow path 78*a* may be connected to the first filter 110 and the confluence inlet pipes 721 and 722 to guide the water discharged from the first filter 110. The second outlet flow path 78*b* may be connected to the second filter 120 and the confluence inlet pipes 721 and 722 to guide the water discharged from the second filter 120. The third outlet flow path 78*c* may be connected to the third filter 130 and the link pipe 79 to guide the water discharged from the third filter 130. The fourth outlet flow path 78*d* may be connected to the fourth filter 140 to guide water discharged from the fourth filter 140.

In addition, the fourth outlet flow path 78*d* may be bent to allow the discharged water to flow to an outlet member 74.

The pipe member 70 may further include a connection pipe 72. The connection pipe 72 may include confluence inlet pipes 721, and 722, and a confluence outlet pipe 723.

The confluence inlet pipes 721 and 722 may be connected to the first outlet flow path 78*a* to allow water discharged from the first filter 110 to flow. The confluence inlet pipes 721 and 722 may extend in the first direction X. The confluence inlet pipes 721 and 722 may include a first confluence inlet pipe 721 and a second confluence inlet pipe 722. However, the present disclosure is not limited thereto, and the first confluence inlet pipe 721 and the second confluence inlet pipe 722 may be integrally formed with each other.

The first confluence inlet pipe 721 may extend in the first direction X to guide the water discharged from the first outlet flow path 78*a*. The second confluence inlet pipe 722 may extend in the first direction X to guide the water discharged from the first confluence inlet pipe 721 and the water may flow in connection with the confluence outlet pipe 723. The confluence outlet pipe 723 may be connected to the confluence inlet pipes 721 and 722, and water may flow into the third inlet flow path 77*c*. That is, the confluence outlet pipe 723 may be connected to the third inlet flow path 77*c*.

The pipe member 70 may further include a plurality of link pipes 79. The link pipe 79 may be connected to the third outlet flow path 78*c* and the fourth inlet flow path 77*d*. The link pipe 79 may include a first link pipe 79*a* and a second link pipe 79*b*.

The first link pipe 79*a* may extend in the first direction X to guide the water discharged from the third outlet flow path 78*c*. That is, the first link pipe 79*a* may be connected to the third outlet flow path 78*c*. The second link pipe 79*b* may extend in the second direction Y to guide water to the fourth inlet flow path 77*d*. That is, the second link pipe 79*b* may be connected to the fourth inlet flow path 77*d*.

Some of the components may be omitted.

Although not shown in the drawings, a check valve may be provided in the inlet 75 and the outlet 76.

By the above configuration, the filter may be compactly arranged in the filter assembly, the resistance of the pipe member 70 may be reduced, and a pressure of discharged water may be increased.

The inlet 75 and the outlet 76 of the plurality of filters 100 may be formed to allow water to flow in a direction perpendicular to the longitudinal direction of the filter. However, the present disclosure is not limited thereto.

In the filter assembly according to another embodiment of the present disclosure, filters may be provided in a refrigerator, and may be arranged inside the refrigerator to allow purified water to be supplied from a refrigerator dispenser. However, the present disclosure is not limited thereto and may be arranged outside the refrigerator to supply purified water.

Figure 8:
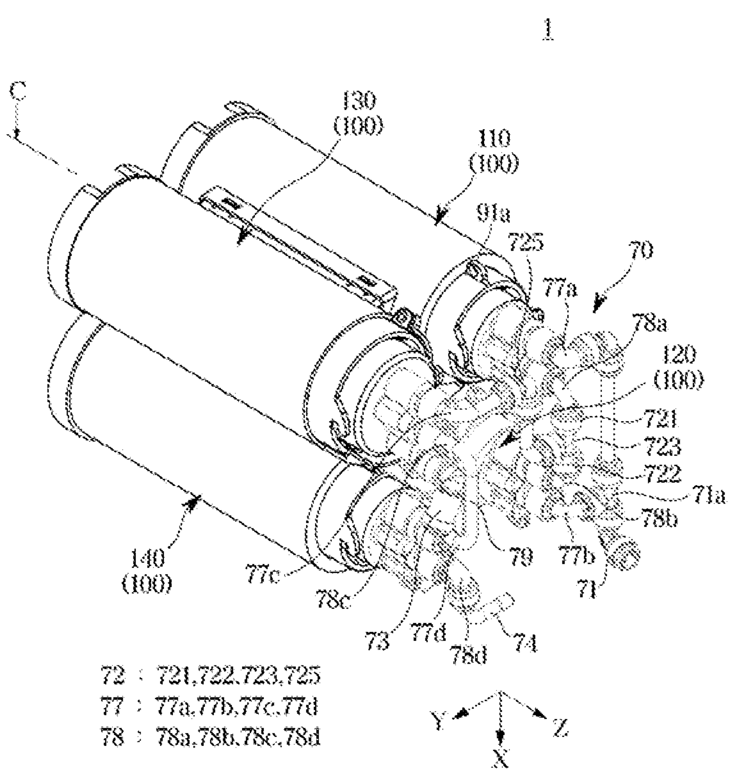
FIG. 8 is a view illustrating a filter assembly according to yet another embodiment of the present disclosure.
Figure 9:
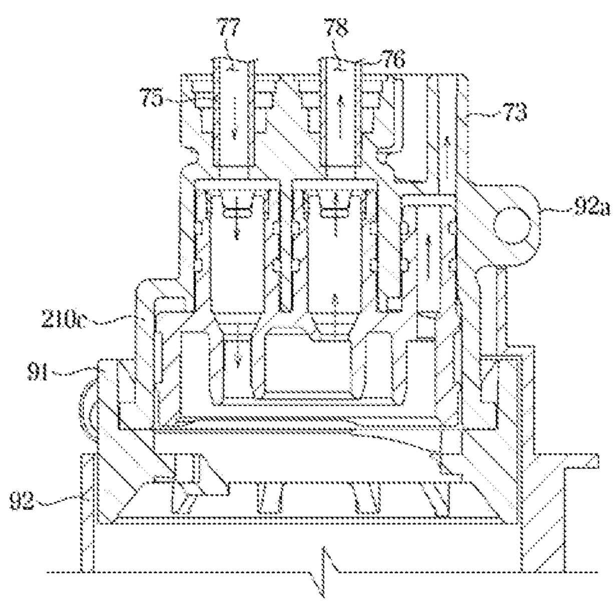
FIG. 9 is a cross-sectional view illustrating a third filter of the filter assembly according to yet another embodiment shown in FIG. 8.

FIG. 8 is a view illustrating a filter assembly according to yet another embodiment of the present disclosure. FIG. 9 is a cross-sectional view illustrating a third filter of the filter assembly according to yet another embodiment shown in FIG. 8.

A basic configuration of the filter assembly and the filter is described above with reference to FIGS. 1 to 7, and thus the same description will be omitted and only differences will be described.

Referring to FIGS. 8 and 9, an inlet 75 and an outlet 76 of each filter may be provided to allow water to be introduced in a longitudinal direction of the filter.

A filter assembly 1 may include a pipe member 70. The pipe member may include an inlet flow path 77 and an outlet flow path 78. An inflow member 71 may be branched and connected to a first inlet flow path 77*a* and a second inlet flow path 77*b* so as to allow water to be introduced in parallel into the plurality of pre-processing filters.

The first inlet flow path 77*a* may extend to guide the water introduced into the first filter 110. That is, the first inlet flow path 77*a* may extend to allow water, which flows in the second direction Y through the inflow member 71, to flow in the third direction Z. The second inlet flow path 77*b* may extend to guide the water introduced into the second filter 120. That is, the second inlet flow path 77*b* may extend to allow water, which flows in the second direction Y through the inflow member 71, to flow in the third direction Z. The third inlet flow path 77*c* may be connected to a bent pipe 725 and the third filter 130 to guide the water introduced into the third filter 130. The fourth inlet flow path 77*d* may be connected to the third outlet flow path 78*c* and extend in the first direction X to guide the water introduced into the fourth filter 140.

The first outlet flow path 78*a* may be connected to the first filter 110 and extend to be bent along the first direction X so as to guide water discharged from the first filter 110. The second outlet flow path 78*b* may be connected to the second filter 120 and extend to be bent along the first direction X so as to guide water discharged from the second filter 120. The third outlet flow path 78*c* may be connected to the third filter 130 and a link pipe 79 to guide the water discharged from the third filter 130. The fourth outlet flow path 78*d* may be connected to the fourth filter 140 to guide the water discharged from the fourth filter 140, and bent in the first direction X and extend so as to allow water to flow to an outlet member 74.

The pipe member 70 may further include a connection pipe 72. The connection pipe 72 may include confluence inlet pipes 721 and 722, a confluence outlet pipe 723, and the bent pipe 725.

The confluence inlet pipes 721 and 722 may extend in the first direction X between the first filter 110 and the second filter 120 to connect the first outlet flow path 78*a* and the second outlet flow path 78*b*. The confluence inlet pipes 721 and 722 may include a first confluence inlet pipe 721 and a second confluence inlet pipe 722.

The first confluence inlet pipe 721 may extend in the first direction X to guide the water discharged from the first outlet flow path 78*a*, and the water discharged from the first outlet flow path 78*a* may flow in connection with the confluence outlet pipe 723. The second confluence inlet pipe 722 may extend in the first direction X to guide the water discharged to the second outlet flow path 78*b*, and the water discharged from the second outlet flow path 78*b* may flow in connection with the confluence outlet pipe 723. The confluence outlet pipe 723 may be connected to the confluence inlet pipes 721 and 722, and water may flow through the bent pipe 725.

The bent pipe 725 may extend in such a way that the flow path is bent between the confluence outlet pipe 723 and the third filter 130. Water discharged from the confluence outlet pipe 723 may be introduced into the third filter 130 through the bent pipe 725. That is, the bent pipe 725 may be connected to the third inlet flow path 77*c*.

The pipe member 70 may further include the link pipe 79. The link pipe 79 may be connected to the third outlet flow path 78*c* and the fourth inlet flow path 77*d*. The link pipe 79 may extend in the first direction X to guide the water discharged from the third outlet flow path 78*c* to the fourth inlet flow path 77*d*.

By the above configuration, the filter may be compactly arranged in the filter assembly, the resistance of the pipe member 70 may be reduced, and a pressure of discharged water may be increased.

The inlet 75 and the outlet 76 of the plurality of filters 100 may be formed to allow water to flow in the longitudinal direction of the filter. However, the present disclosure is not limited thereto.

Some of the components may be omitted.

A coupler 91 may include a coupling member 91*a* provided outside a head member. The coupling member 91*a* may be coupled to a fixing member 92*a* provided outside the filter.

According to the embodiment, the water introduced into the inlet 75 provided in the longitudinal direction of the filter may be filtered and then discharged in a direction, which is parallel to but opposite to the direction into which the water is introduced, through the outlet 76. In addition, purified water and contaminated water may be partially discharged to the drain member 73.

In the filter assembly according to yet another embodiment of the present disclosure, filters may be provided in a refrigerator, and may be arranged inside the refrigerator to allow purified water to be supplied from a refrigerator dispenser. However, the present disclosure is not limited thereto and may be arranged outside the refrigerator to supply purified water.

Figure 10:
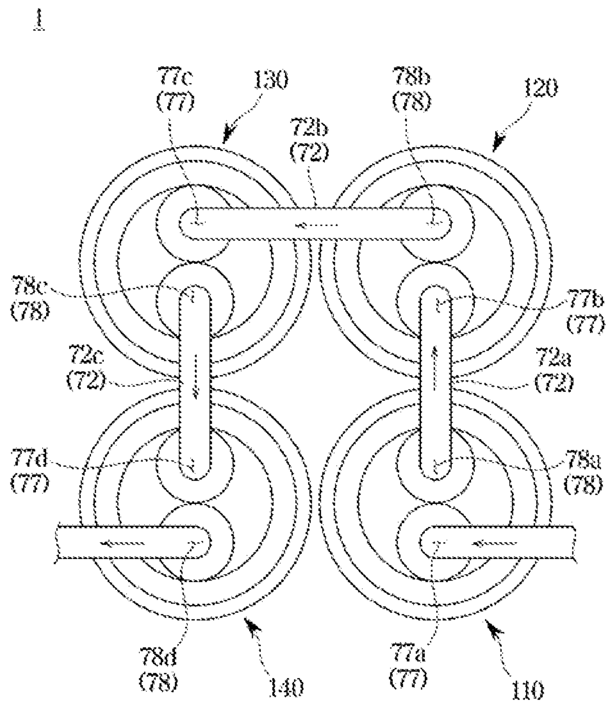
FIG. 10 is a view schematically illustrating a pipe member in a filter assembly according to yet another embodiment of the present disclosure.

FIG. 10 is a view schematically illustrating a pipe member in a filter assembly according to yet another embodiment of the present disclosure.

Referring to FIG. 10, a filter assembly 1 may include a pipe member 70. The pipe member 70 may include an inlet flow path, an outlet flow path, and a connection pipe 72.

Each filter may be connected in series through the inlet flow path 77 and the outlet flow path 78. Particularly, a first inlet flow path 77*a* may extend to guide the water introduced into a first filter 110. A second inlet flow path 77*b* may extend to guide the water introduced into a second filter 120. That is, the second inlet flow path 77*b* may extend to guide the water discharged from a first outlet flow path 78*a* to the second filter 120 through a first connection pipe 72*a*. A third inlet flow path 77*c* may extend to guide the water introduced into a third filter 130. That is, the third inlet flow path 77*c* may extend to guide the water discharged from a second outlet flow path 78*b* to the third filter 130 through a second connection pipe 72*b*. A fourth inlet flow path 77*d* may extend to guide the water introduced into a fourth filter 140. That is, the fourth inlet flow path 77*d* may extend to guide the water discharged from a third outlet flow path 78*c* to the fourth filter 140 through a third connection pipe 72*c*.

The drain member 73 is not shown in the drawing, but is not limited thereto. Accordingly, the drain member 73 may be included in the pipe member 70.

In the filter assembly according to yet another embodiment of the present disclosure, filters may be provided in a refrigerator, and may be arranged inside the refrigerator to allow purified water to be supplied from a refrigerator dispenser. However, the present disclosure is not limited thereto and may be arranged outside the refrigerator to supply purified water.

Figure 11:
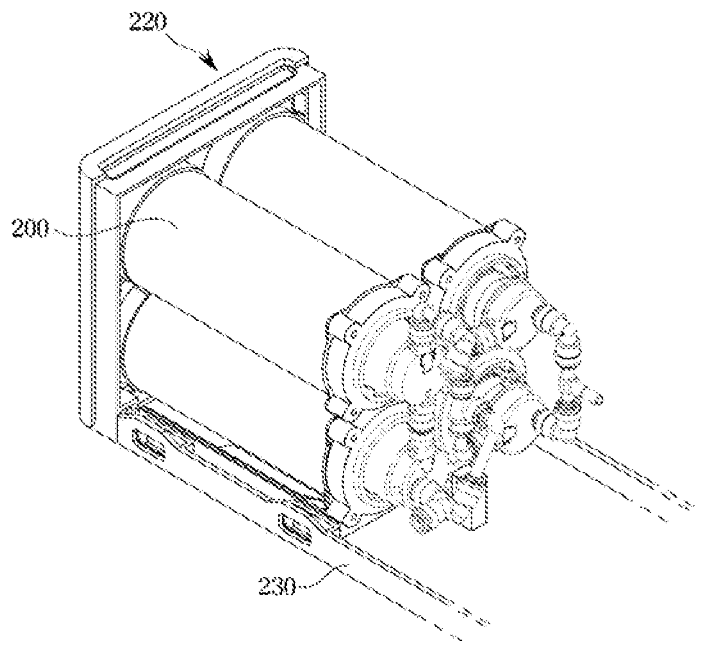
FIG. 11 is a view illustrating a state in which an inner casing and a door bracket are mounted in the filter assembly according to one embodiment shown in FIG. 3.
Figure 12:
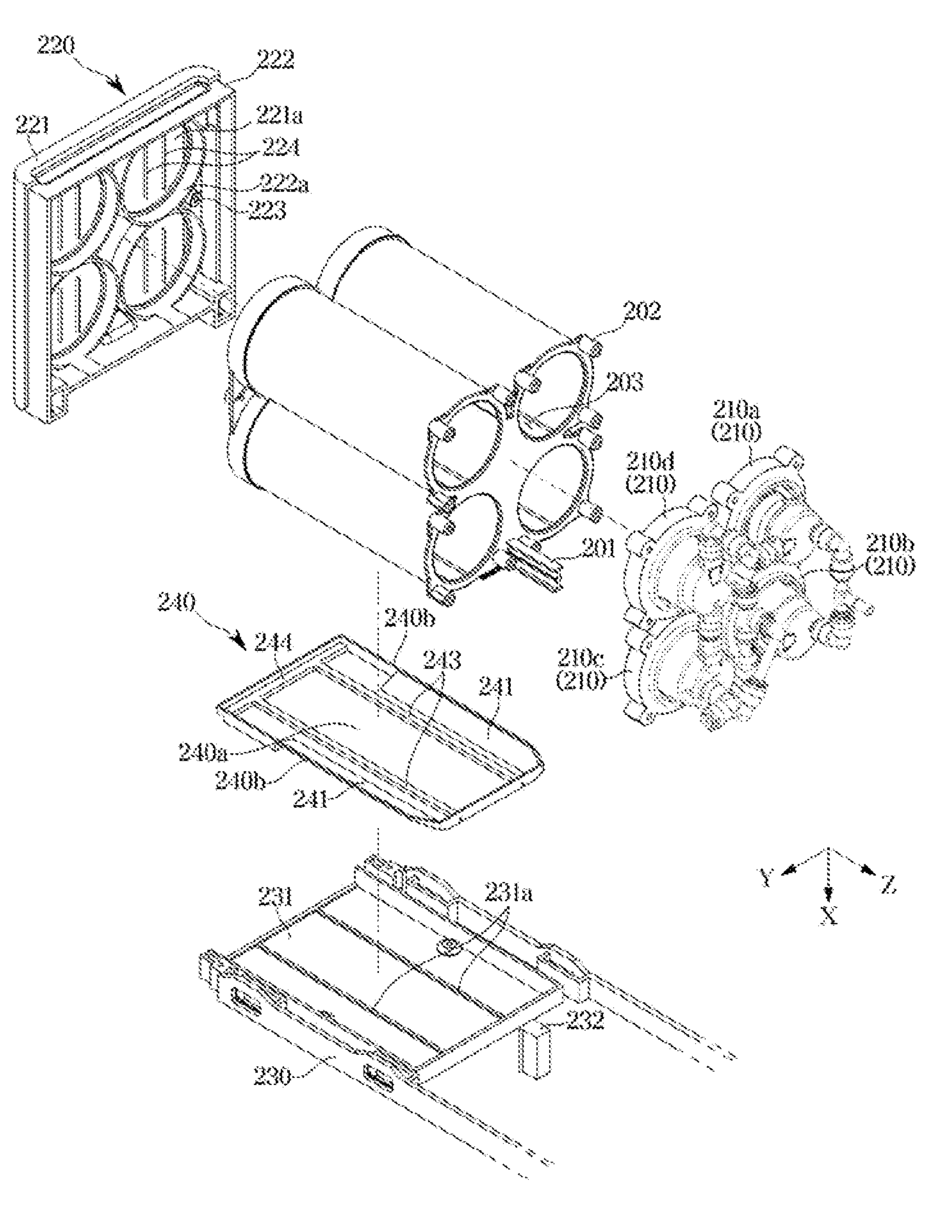
FIG. 12 is an exploded-view illustrating some components in the filter assembly according to one embodiment shown in FIG. 11.

FIG. 11 is a view illustrating a state in which an inner casing and the door bracket are mounted in the filter assembly according to one embodiment shown in FIG. 3. FIG. 12 is an exploded-view illustrating some components in the filter assembly according to one embodiment shown in FIG. 11.

Referring to FIGS. 11 and 12, an inner casing 200 may include a protrusion 201, a first fixing pin 202, and a residual water hole 203. In FIG. 10, the inside of each filter is omitted.

A fixing member may be provided on the outside of the plurality of filters to allow the plurality of filters to be adjacent to each other. That is, it is possible to make the arrangement of the filter compact. In addition, the withdrawal or insertion of the plurality of filters may be performed at once.

The protrusion 201 may be formed on a lower side of the inner casing 200 in the longitudinal direction of the filter. The protrusion 201 may be inserted into an insertion member 232 to be described later. A support member 230 and the inner casing 200 may be coupled to each other by the inserted protrusion 201. Some of the components may be omitted.

The filter assembly 1 may further include the mounting member 210. The mounting member 210 may be provided in plurality to couple each filter to the inner casing 200. Each filter may be coupled to the mounting member 210. For example, the first filter 110 may be coupled to a first mounting member 210*a*. The second filter 120 may be coupled to a second mounting member 210*b*. The third filter 130 may be coupled to a third mounting member 210*c*. The fourth filter 140 may be coupled to a fourth mounting member 210*d*. Some of the components may be omitted.

The first fixing pin 202 may extend in the longitudinal direction of the filter and may be provided in plurality. The first fixing pin 202 may be provided to be coupled to the mounting member 210 of each filter.

The residual water hole 203 provided in the inner casing 200 may be provided to allow water, which leaks from each filter, to flow to a water collecting tray 240 to be described later. Accordingly, it is possible to prevent water from leaking out of the filter assembly. The residual water hole 203 may be provided to correspond to each filter, and thus the residual water holes 203 may be provided in plurality. In the drawing, the residual water hole 203 is shown as a square, but is not limited thereto. Alternatively, the residual water hole 203 may include a shape such as a circle. Some of the components may be omitted.

The filter assembly may further include the water collecting tray 240. The water collecting tray 240 may be removably coupled between the inner casing 200 and the support member 230. The water collecting tray 240 may include an inclined member 241, a protrusion 243 corresponding to a guide groove 242 to be described later, and a gripping member 244. When the filter assembly is used for a long time, raw water or purified water flowing through the flow path may leak. In addition, water may drain through the residual water hole 203 provided in the inner casing 200. Further, water may leak to the outside when the filter is replaced. In this case, leaking water or falling water may be collected using the water collecting tray 240. A user can remove the water collected in the water collecting tray 240 by pulling out the water collecting tray 240 after opening the filter assembly.

The inclined member 241 may collect water leaking from the residual water hole 203 toward a central member 240*a* of the water collecting tray 240. Accordingly, the inclined member 241 may be formed to be inclined downwardly from opposite side end members 240*b* toward the central member 240*a*. The inclined member 241 may be provided at opposite side ends of the water collecting tray 240, respectively. That is, the inclined member 241 may be provided in plurality. A shape and length of the inclined member 241 are not limited to those shown in the drawings, and the inclined member 241 may extend to the gripping member 244.

The protrusion 243 may be formed to correspond to the guide groove 242 to be described later. The protrusion 243 may protrude toward the inner casing 200. The guide groove 242 may be coupled to an insertion protrusion 231*a* provided on the support member 230. The guide groove 242 may be provided in plurality.

The gripping member 244 may be provided to allow a user to draw out the water collecting tray 240. Accordingly, the gripping member 244 may protrude toward the inner casing 200. However, the present disclosure is not limited thereto and the gripping member 244 may be recessed from one end of the water collecting tray 240 to form a groove. Accordingly, a user can draw out the water collecting tray 240 in which the water is collected.

The filter assembly may include the door bracket 220 and the support member 230. The door bracket 220 may be provided on one side of the plurality of filters 100 fixed by the inner casing 200, so as to fix the filters to prevent the filters from shaking.

The door bracket 220 may include a first door bracket 221 and a second door bracket 222. The first door bracket 221 and the second door bracket 222 may each include a groove for a handle (not shown). A user can easily draw out the filter by using the groove for the handle. Some of the components may be omitted.

The second door bracket 222 may form a space corresponding to the shape of the filter. The space may form a first insertion member 221*a* by the coupling of the first door bracket 221 and the second door bracket 222. The plurality of filters coupled to the inner casing 200 may be mounted on the first insertion member 221*a*. In addition, the filter assembly may include a second insertion member 222*a* provided to mount the plurality of filters 100 from the lateral side.

The second door bracket 222 may further include a second fixing pin 223. The second fixing pin 223 may be coupled to a coupling groove (not shown) provided to correspond to the inner casing 200. Accordingly, the inner casing 200 and the door bracket 220 may be stably coupled to each other. Some of the components may be omitted.

The filter assembly may further include the support member 230. The support member 230 may allow the plurality of filters to be stably mounted on the filter assembly at the lateral side of the plurality of filters.

The support member 230 may include a third insertion member 231 and the insertion member 232. The third insertion member 231 may be formed in a shape corresponding to the water collecting tray 240. Accordingly, the water collecting tray 240 and the plurality of filters may be mounted on the third insertion member 231.

The insertion member 232 may be formed to extend in a direction perpendicular to a longitudinal direction of the support member 230. The insertion member 232 may be arranged to be spaced apart from the third insertion member 231, and may be coupled to the protrusion 201 provided in the inner casing 200. The insertion member 232 may include a concave member (not shown). That is, the protrusion 201 may be coupled to the concave member provided in the insertion member 232. Accordingly, the inner casing 200 and the support member 230 may be stably coupled to each other. Some of the above components may be omitted.

The door bracket 220 may further include the door block 224 provided to be coupled to the protruding member 136 of each filter. Particularly, the door block 224 may be formed on the first door bracket 221. The door block 224 may include a bar shape extending in the vertical direction. In the drawing, the door block 224 is provided shown as four pairs, but the present disclosure is not limited thereto. Alternatively, the door block 224 may be formed in a number corresponding to the number of filters. In addition, a shape of the door block 224 may include various shapes such as a square prism, a triangular prism, and a cylinder. The door block 224 may be integrally formed with the first door bracket 221. However, the present disclosure is not limited thereto and the door block 224 and the first door bracket 221 may be separately manufactured and then coupled to each other.

Figure 13:
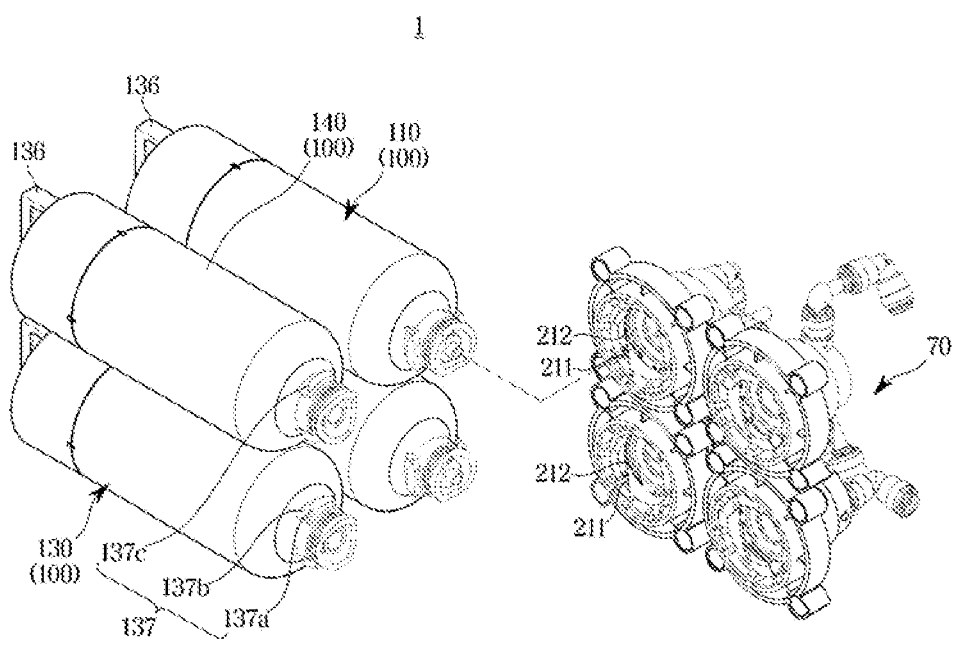
FIG. 13 is a view illustrating a coupling relationship between the filter and a mounting member in the filter assembly according to one embodiment shown in FIG. 11.
Figure 14:
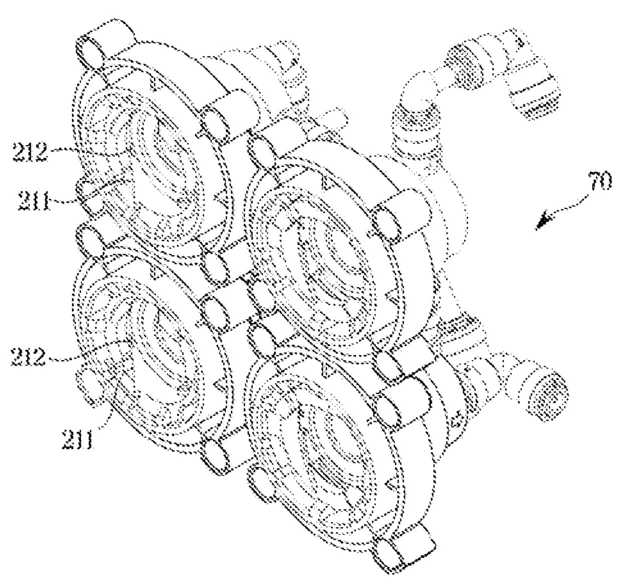
FIG. 14 is an enlarged-view illustrating the mounting member in the filter assembly according to one embodiment shown in FIG. 11.

FIG. 13 is a view illustrating a coupling relationship between the filter and the mounting member in the filter assembly according to one embodiment shown in FIG. 11. FIG. 14 is an enlarged-view illustrating the mounting member in the filter assembly according to one embodiment shown in FIG. 11.

Referring to FIGS. 13 and 14, the filter assembly may include a guide 211 and an insertion member 212. The guide 211 and the insertion member 212 may be coupled to a mounting protrusion 137 protruding in a radial direction from an upper end of the filter.

In order to be rotated and coupled to the mounting protrusion 137, the guide 211 may be formed to be inclined toward the pipe member 70 on the inside of the mounting member 210. The insertion member 212 may be formed to be flat along the radial direction of the mounting member 210 to allow the mounting protrusion 137, which is rotationally coupled through the guide 211, to be inserted. The guide 211 may protrude inward in the radial direction of the mounting member 210 than the insertion member 212 and thus a step difference may occur between the guide 211 and the insertion member 212.

The mounting protrusion 137 may include a first member 137*a* and a second member 137*b*. The first member 137*a* may protrude from an upper portion of the upper housing 131*a* in a radial direction of the cylindrical filter. The first member 137*a* may rotate and pass through the guide 211, and may be coupled to the insertion member 212. The second member 137*b* may not protrude but be formed have a step difference with the guide 211. The second member 137*b* may be coupled to the guide 211. Accordingly, the second member 137*b* may include a shape corresponding to the insertion member 212.

Each filter includes two guides 211, two insertion members 212, and two mounting protrusions 137 in the drawings, but the present disclosure is not limited thereto. Each filter may include one or three or more of the guides 211, the insertion members 212, and the mounting protrusions 137.

In response to the filter 100 being coupled to the mounting member 210 in a correct position, the guide 211 and the insertion member 212 may be coupled to the mounting protrusion 137. In response to the filter 100 being incorrectly coupled to the mounting member 210, the guide 211 and the insertion member 212 may not be coupled to the mounting protrusion 137. Accordingly, a user can recognize whether the coupling is performed correctly. Therefore, it is possible to prevent difficulties such as water leakage that occurs caused by the incorrect coupling between the filter 100 and the mounting member 210. In the drawing, the filter 100 and the mounting member 210 are coupled to each other in the correct position, and thus the door block 224 and the protruding member 136 face each other.

Figure 15:
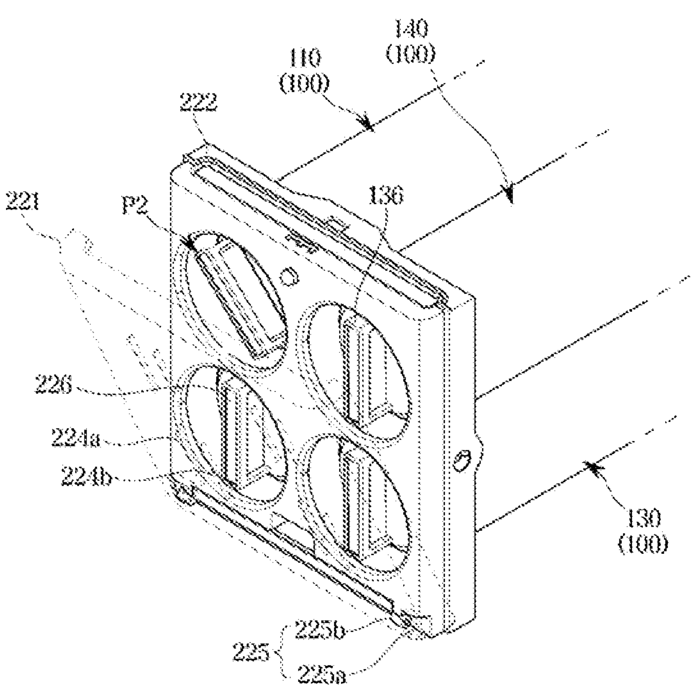
FIG. 15 is a view illustrating a state in which the mounting member is not fully coupled to the filter in the filter assembly according to one embodiment shown in FIG. 11.
Figure 16:
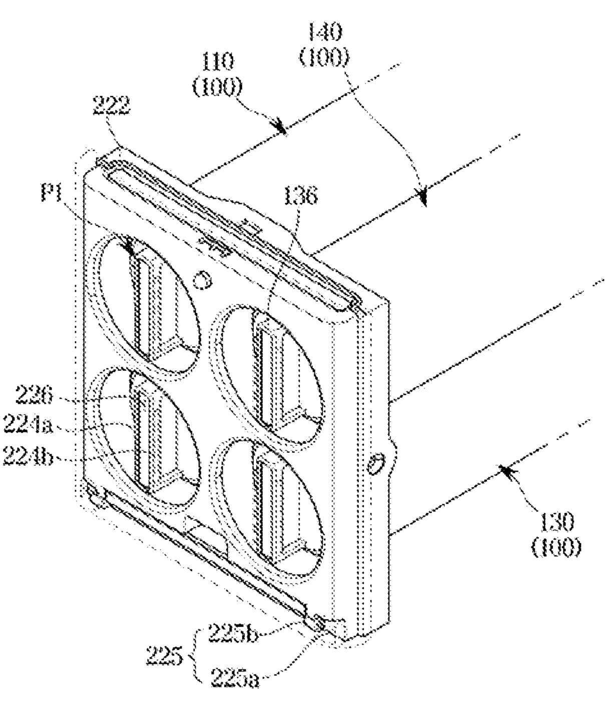
FIG. 16 is a view illustrating a state in which the mounting member is fully coupled to the filter in the filter assembly shown in FIG. 11.

FIG. 15 is a view illustrating a state in which the mounting member is not fully coupled to the filter in the filter assembly according to one embodiment shown in FIG. 11. FIG. 16 is a view illustrating a state in which the mounting member is fully coupled to the filter in the filter assembly shown in FIG. 11.

Referring to FIGS. 15 and 16, the first door bracket 221 and the second door bracket 222 may be coupled by a hinge 225 provided at one end thereof. The hinge 225 may include a first hinge member 225*a* and a second hinge member 225*b*. The first hinge member 225*a* may be formed on the first door bracket 221, and the second hinge member 225*b* may be formed on the second door bracket 222. The first hinge member 225*a* and the second hinge member 225*b* may be coupled and thus the first door bracket 221 and the second door bracket 222 may be rotatably coupled. The first hinge member 225*a* and the second hinge member 225*b* may be provided in plurality. However, an opening and closing method of the outer casing 2 is not limited to the above example, and the outer casing 2 may be opened and closed by various methods such as sliding, detachment, etc. The door block 224 may include a first block 224*a*, and a second block 224*b*.

The first block 224*a* and the second block 224*b* may extend in one direction. In the drawing, the door block 224 extends in the first direction X, but is not limited thereto. Alternatively, the first block 224*a* and the second block 224*b* may extend in various directions according to the correct coupling position of the filter 100 and the mounting member 210.

The door bracket 220 may further include the seating member 226 formed between the first block 224*a* and the second block 224*b*. That is, the seating member 226 may be a space between the first block 224*a* and the second block 224*b*. The protrusion member 136 may be in contact with the seating member 226.

The filter 100 may be arranged in a first position P1 or a second position P2. The first position P1 may be a state in which the filter 100 is correctly coupled to the mounting member 210. That is, in response to the filter 100 being fully coupled to the mounting member 210, the filter 100 may be arranged in the first position P1. The first position P1 may be a correct position. Conversely, in response to the filter 100 not being fully coupled to the mounting member 210, that is, in response to the filter 100 being incorrectly coupled to the mounting member 210, the filter may be arranged in the second position P2. The second position P2 is not limited to that shown in the drawing, and a position, in which the door brackets 221 and 222 are not closed because the position is not the first position P1 corresponding to the correction position, may correspond to the second position.

As for the protrusion member 136, a length extending in the first direction X may be referred to as a first length and a length extending in the second direction X may be referred to as a second length. The first length may be greater than the second length. However, the first length and the second length are not limited to those shown in the drawings.

As illustrated in FIG. 15, in response to the filter 100 being incorrectly coupled or not being fully coupled to the mounting member 210, the door block 224 and the protruding member 136 may not come into contact with each other, and thus a user can identify whether the coupling is performed correctly. In response to the filter 100 being positioned in the second position P2, the first door bracket 221 and the second door bracket 222 may not be completely in contact with each other. That is, although not shown in the drawings, the door brackets 221 and 222 may not close the components such as the outer casing 2.

In the drawing, the first filter 110 is not fully coupled, but it is not limited to the first filter 110.

As shown in FIG. 16, in response to the filter 100 being correctly or fully coupled to the mounting member 210, the door block 224 and the protruding member 136 may be in contact with each other, and thus a user can identify whether the coupling is performed correctly. In response to the filter 100 being positioned in the first position P1, the first door bracket 221 and the second door bracket 222 may be completely in contact with each other. That is, although not shown in the drawings, the door brackets 221 and 222 may completely close the components such as the outer casing 2. Further, in the first position P1, the protrusion member 136 may be seated on the seating member 226. Accordingly, the protruding member 136 may be referred to as a seating member 136.

Further, in response to both the door block 224 and the protruding member 136 extending in the first direction X, the first door bracket 221 and the second door bracket 222 may be completely in contact with each other. That is, in response to the door block 224 and the protruding member 136 being arranged in parallel, the door brackets 221 and 222 may be closed. However, the present disclosure is not limited thereto, and as shown in FIG. 17 to be described later, even when the door block 224 and the protruding member 136 are not arranged in parallel in the filter assembly according to the embodiment of the present disclosure, the door brackets 221 and 222 may be closed.

Accordingly, in response to the filter 100 being not coupled in the first position P1, the door brackets 221 and 222 may not be closed, and thus a user can recognize that the filter 100 is incorrectly assembled. Therefore, the user may mount the filter 100 to the first position P1. Accordingly, it is possible to prevent difficulties such as water leakage caused by the incorrect coupling between the filter 100 and the filter assembly. FIG. 17 is a view illustrating a door bracket in a filter assembly according to yet another embodiment of the present disclosure.

Figure 17:
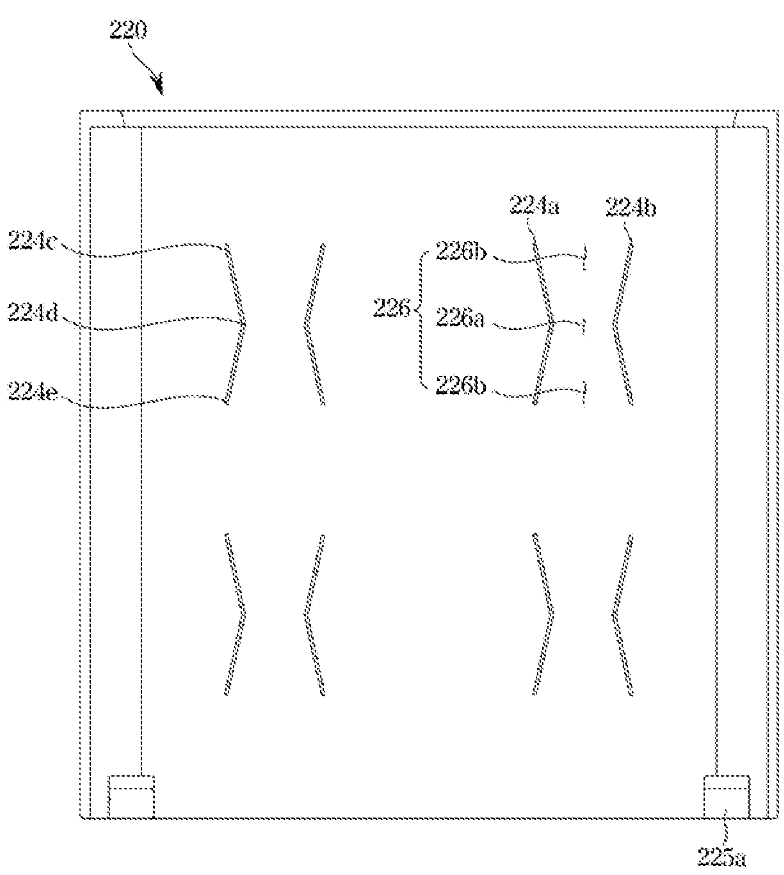
FIG. 17 is a view illustrating a door bracket in a filter assembly according to yet another embodiment of the present disclosure.

Referring to FIG. 17, the door block 224 may include a shape in which a middle portion is curved. Accordingly, the door block 224 extends in a straight line in one direction in FIGS. 15 and 16, but is not limited thereto and may include various shapes.

The door block 224 may include a first extension 224*c* inclined from an upper side to a lower side, a bent member 224*d* bent at the first extension 224*c*, and a second extension 224*e* inclined from the bent member 224*d* to the lower side.

Particularly, the first extension 224*c* and the second extension 224*e* may include inclinations in opposite directions. That is, the first extension 224*c* may be inclined downwardly from left to right, and the second extension 224*e* may be inclined downwardly from right to left. Conversely, the first extension 224*c* may be inclined downwardly from right to left, and the second extension 224*e* may be inclined downwardly from left to right.

In the drawings, the first extension 224*c* and the second extension 224*e* include the same inclination, but the present disclosure is not limited thereto. The first extension 224*c* and the second extension 224*e* may include different inclination.

The seating member 226, on which the protruding member 136 is mounted, may be formed between the first block 224*a* and the second block 224*b*. A middle portion of the seating member 226 may be a first member 226*a*. A peripheral portion of the seating member 226 may be a second member 226*b*. A width of the first member 226*a* may be similar to a width of the protruding member 136, and a width of the seating member 226 may increase toward the second member 226*b*. That is, the seating member 226 may include a free space to allow the door bracket 226 to be coupled to the filter as long as the water does not leak.

In other words, when it is assumed that a distance between the bent member of the first block 224*a* and the bent member of the second block 224*b* is a first distance, and a distance between the first extension of the first block 224*a* and the first extension of the second block 224*b* is a second distance, the first distance may be less than the second distance. However, the present disclosure is not limited thereto, and the first distance may be formed to be greater than the second distance as long as the protruding member 136 is seated on the seating member 226.

Figure 18:
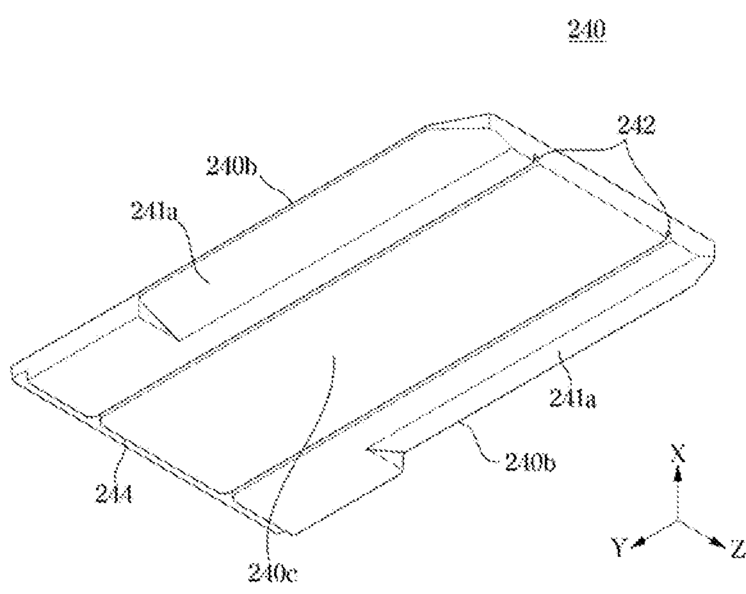
FIG. 18 is a bottom view illustrating a water collecting tray in the filter assembly according to FIG. 12.

FIG. 18 is a bottom view illustrating the water collecting tray in the filter assembly according to FIG. 12.

Referring to FIG. 18, the water collecting tray 240 may include an inclined bottom surface 241*a* and the guide groove 242.

The inclined bottom surface 241*a* may be inclined downwardly from the opposite side end members 240*b* toward the central member 240*a* of the water collecting tray 240. That is, the inclined bottom surface 241*a* may be formed to correspond to the inclined member 241. However, a shape of the inclined bottom surface 241*a* is not dependent on the inclined member 241 and thus may include various shapes.

The guide groove 242 may be formed by being recessed from the lower surface 240*c* of the residual water tray 240. The guide groove 242 may be formed to correspond to the seating member protrusion 231*a* of the support member 230. In addition, the guide groove 242 may be formed to correspond to a guide rail 234 to be described later. The guide groove 242 may be provided in plurality. However, the number of guide grooves 242 is not limited to that shown in the drawings.

Figure 19:
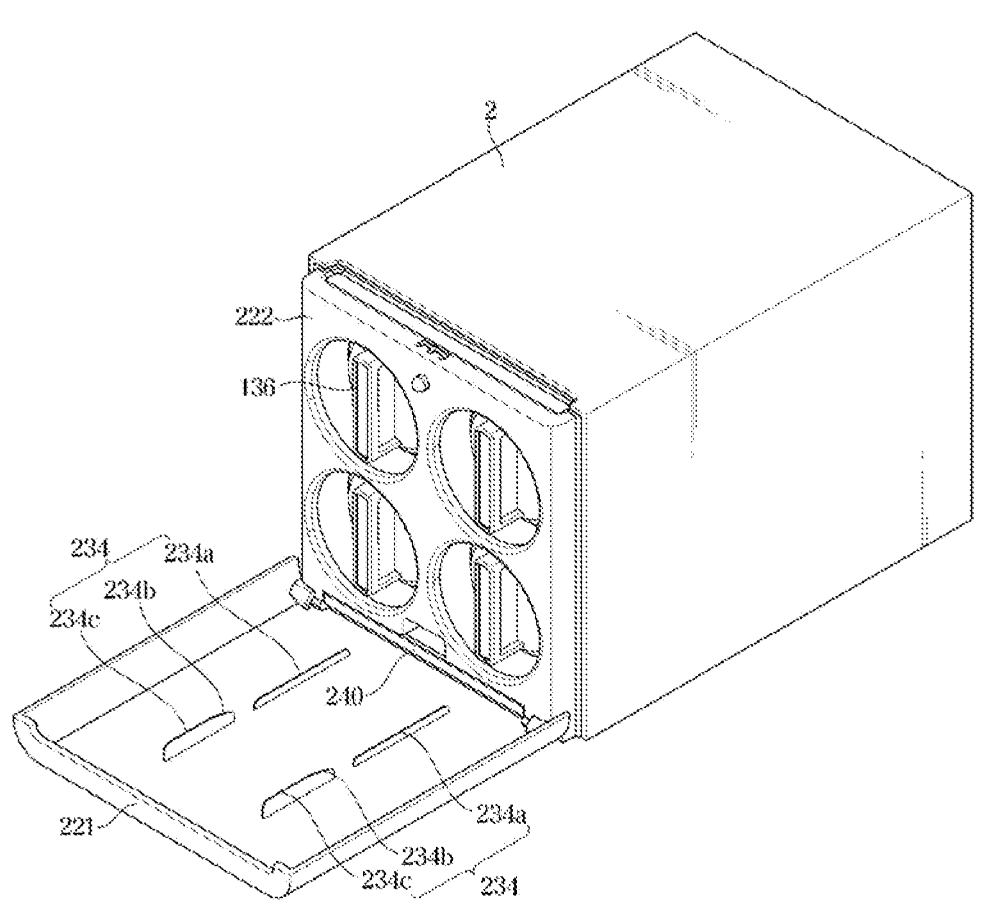
FIG. 19 is a view illustrating a state in which a first door bracket is opened in a filter assembly according to yet another embodiment of the present disclosure.
Figure 20:
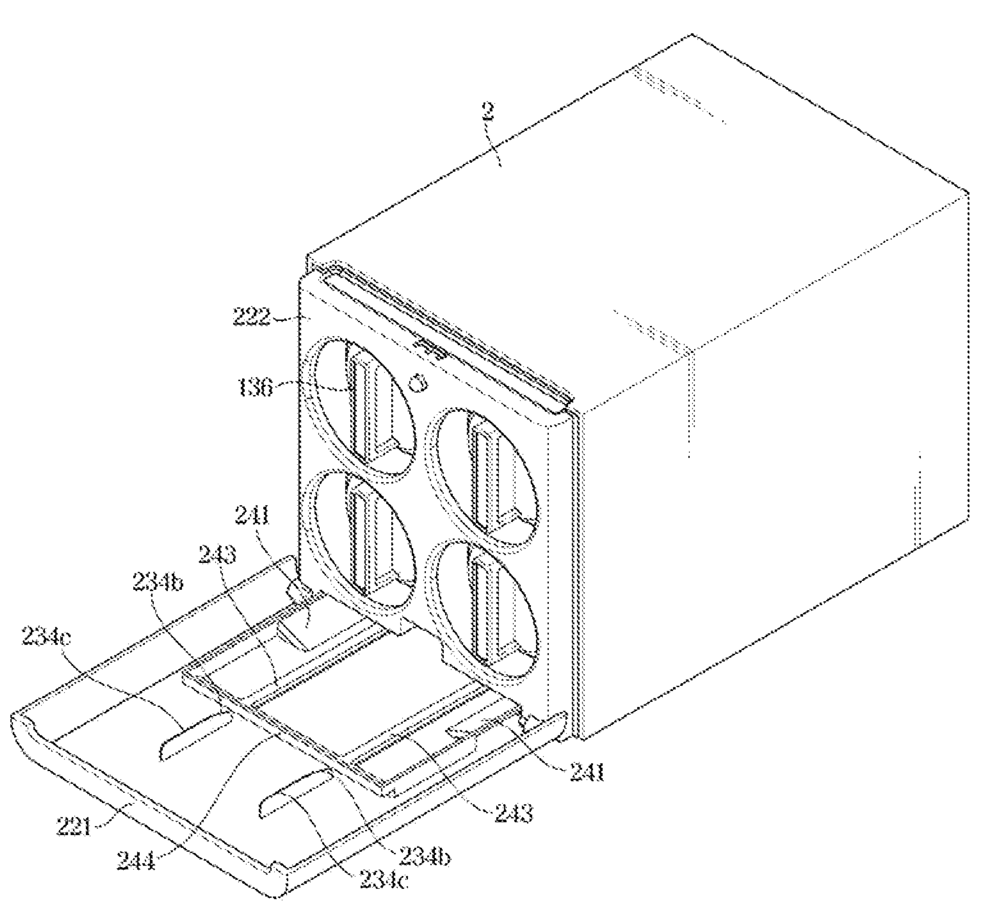
FIG. 20 is a view illustrating a process in which a water collecting tray is drawn out from the filter assembly shown in FIG. 19.
Figure 21:
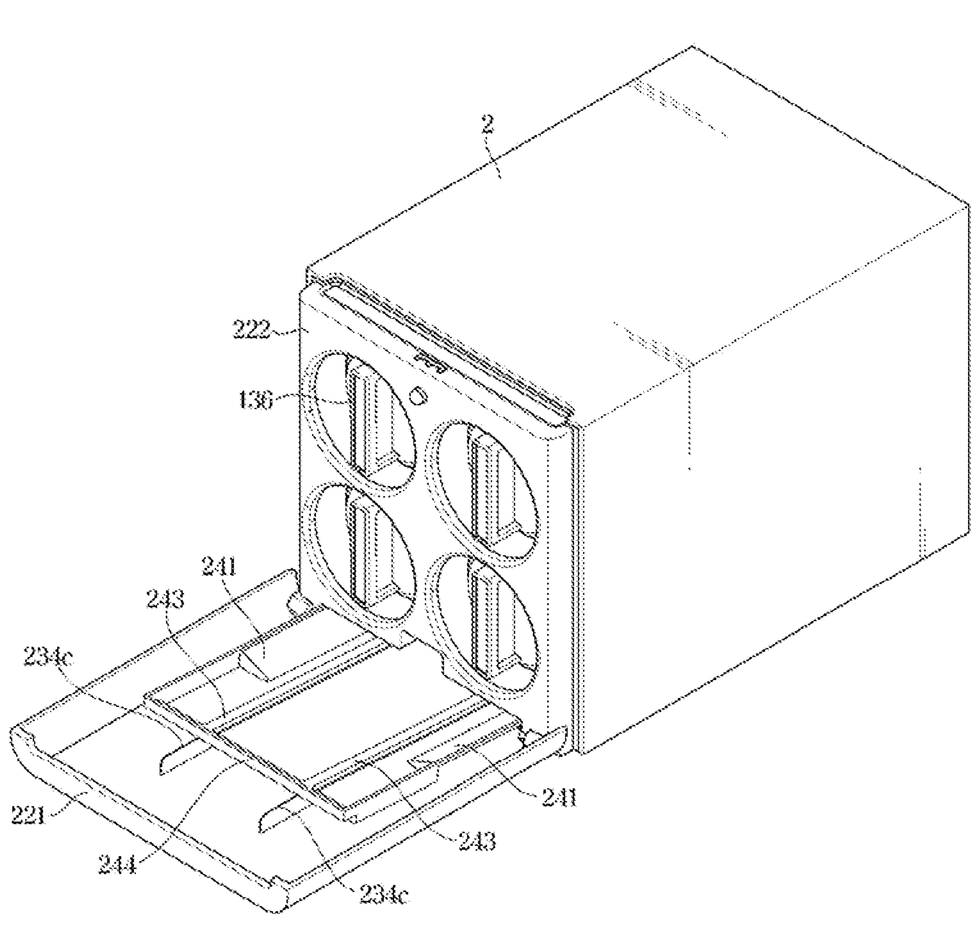
FIG. 21 is a view illustrating the process in which the water collecting tray is drawn out from the filter assembly shown in FIG. 19.
Figure 22:
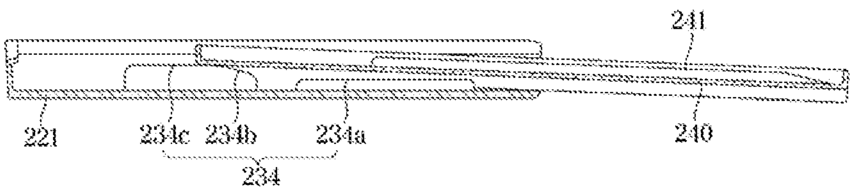
FIG. 22 is a cross-sectional view illustrating the process in which the water collecting tray is drawn out from the filter assembly shown in FIG. 21.

FIG. 19 is a view illustrating a state in which a first door bracket is opened in a filter assembly according to yet another embodiment of the present disclosure. FIG. 20 is a view illustrating a process in which a water collecting tray is drawn out from the filter assembly shown in FIG. 19. FIG. 21 is a view illustrating the process in which the water collecting tray is drawn out from the filter assembly shown in FIG. 19. FIG. 22 is a cross-sectional view illustrating the process in which the water collecting tray is drawn out from the filter assembly shown in FIG. 21.

Referring to FIGS. 19 to 22, the door bracket 220 may be rotatably coupled to the outer casing 2. In addition, the door bracket 220 may be rotatably coupled to the support member 230.

The door bracket 220 may be composed of only the first door bracket 221, which is different from the drawings. The inner casing 200 may include a space arranged on one side of the inner casing 200 and provided to correspond to a shape of the filter. The space may form a first insertion member 221*a* by coupling to the first door bracket 221.

The filter assembly may include the door block 224 formed on the door bracket 220. Particularly, the door block 224 may be formed on the first door bracket 221. The door block 224 may be the door rail 234 provided to guide withdrawal of the water collecting tray 240. That is, the door rail 234 may extend in the third direction to guide the withdrawal of the water collecting tray 240 in response to the door bracket 220 being opened.

The door rail 234 may guide the plurality of filters 100 to be assembled to the mounting member 210. That is, the first door bracket 221 may not be coupled to the second door bracket 222 in response to the filter 100 being incorrectly assembled to the mounting member 210, and the door rail 234 may prevent each of the plurality of filters 100 from being incorrectly assembled to the mounting member 210. The door rail 234 may be formed in a position similar to the above-described first door block 224*a*. Accordingly, in response to each of the plurality of filters 100 being correctly mounted on the mounting member 210, the first door bracket 221 may be coupled to the second door bracket 222. However, in response to the filter 100 not being correctly mounted on the mounting member 210, the door rail 234 and the protruding member 136 may interfere with each other, and thus the first door bracket 221 and the second door bracket 222 may not be coupled to each other (refer to FIG. 15). That is, the door bracket 220 coupled to the outer casing 2 may not be closed.

A position in which the door rail 234 is formed may not be limited to a position similar to that of the first door block 224*a*, but may be arranged in a position similar to the second door block 224*b*, thereby preventing the incorrect assembly of the plurality of filters 100. In addition, as long as it is possible to prevent the incorrect assembly of the plurality of filters 100, the door rail 234 may be formed in various positions.

The door rail 234 may include a plurality of rails 234*a*, 234*b*, and 234*c* provided to guide the withdrawal of the water collecting tray 240. The plurality of rails 234*a*, 234*b*, and 234*c* may include a first rail 234*a*, a second rail 234*b*, and a third rail 234*c*. At least one of each of the first rail 234*a*, the second rail 234*b*, and the third rail 234*c* may be provided. However, the number of the rails is not limited to the number shown in the drawings. That is, one or three or more of the rails may be provided. Due to the plurality of rails 234*a*, 234*b*, and 234*c*, the water collecting tray 240 may be safely removed from the filter assembly 1 without leakage of water while the water collecting tray 240 is drawn out. In addition, as described above, because the door block 234 prevents the incorrect coupling of the filter 100, the plurality of rails 234*a*, 234*b*, and 234*c* may allow a user to recognize the incorrect coupling between the filter 100 and the mounting member 210.

The first rail 234*a* may be formed in a lower portion of the door bracket 220. That is, the first rail 234*a* may be provided adjacent to the water collecting tray 240. The first rail 234*a* may be formed to have a height corresponding to the guide groove 242. As shown in FIG. 20, the water collecting tray 240 may be drawn out of the outer casing 2 through the first rail 234*a*.

The second rail 234*b* may be formed in a middle portion of the door bracket 220. The second rail 234*b* may be formed between the first rail 234*a* and the third rail 234*c*. The second rail 234*b* may allow the water collecting tray 240, which is drawn out through the first rail 234*a*, to move upward. That is, the second rail 234*b* may be inclined upwardly to the third rail 234*c*. As shown in FIGS. 21 and 22, the water collecting tray 240 may be moved obliquely to the upper side through the second rail 234*b*. Accordingly, an angle may be formed between the door bracket 220 and the water collecting tray 240. Particularly, an angle may be formed between the first door bracket 221 and the water collecting tray 240.

The third rail 234*c* may be connected to the second rail 234*b* to allow the water collecting tray 240 to be drawn out. The third rail 234*c* may be formed in an upper portion of the door bracket 220. That is, the third rail 234*c* may be formed furthest from the water collecting tray 240 among the plurality of rails 234*a*, 234*b*, and 234*c*. The third rail 234*c* may be formed to have the highest height among the plurality of rails 234*a*, 234*b*, and 234*c*. That is, the third rail 234*c* may be formed to be higher than the first rail 234*a* and the second rail 234*b*. In response to the water collecting tray 240 being drawn out to the upper end of the third rail 234*c*, the water collecting tray 240 arranged between the support member 230 and the inner casing 200 may be separated. Accordingly, a user can remove the water collected in the water collecting tray 240.

The first rail 234*a* and the second rail 234*b* may be formed to be spaced apart from each other. The second rail 234*b* and the third rail 234*c* may be integrally formed with each other. However, the present disclosure is not limited thereto, and the first rail 234*a*, the second rail 234*b*, and the third rail 234*c* may be formed to be spaced apart from each other, or may be formed integrally as a whole. Alternatively, the first rail 234*a* and the second rail 234*b* may be integrally formed with each other, and the second rail 234*b* and the third rail 234*c* may be formed to be spaced apart.

While the present disclosure has been particularly described with reference to exemplary embodiments, it should be understood by those of skilled in the art that various changes in form and details may be made without departing from the spirit and scope of the present disclosure.

What is claimed is:

1. A filter assembly comprising:

an outer casing forming an exterior of the filter assembly;

a plurality of filters to be arranged in the outer casing, and the plurality of filters comprising a first filter, a second filter, and a third filter;

a pipe member to be connected to the first filter, the second filter, and the third filter, and the pipe member comprising:

an inlet flow path which comprises:

a first inlet flow path which while connected to the first filter allows water to be introduced into the first filter, a second inlet flow path which while connected to the second filter allows water to be introduced into the second filter, a third inlet flow path which while connected to the third filter allows water to be introduced into the third filter, and an inflow member comprising a branch point to allow water to flow in parallel through the first inlet flow path and the second inlet flow path which are parallel to each other, and an outlet flow path which comprises:

a first outlet flow path which while connected to the first filter allows water to be discharged from the first filter, and a second outlet flow path which while connected to the second filter allows water to be discharged from the second filter;

an inner casing arranged outside the first filter, the second filter, and the third filter to fix the first filter, the second filter, and the third filter;

a residual water hole arranged on the inner casing;

a support member, including an insertion protrusion, arranged under the inner casing and coupled to the inner casing; and a water collecting tray, slidable along the support member, to be introduced into the outer casing between the inner casing and the support member and withdrawn from the outer casing, the water collecting tray being below the residual water hole such that residual water from the first filter, the second filter, and the third filter is discharged through the residual water hole and collected in the water collecting tray, wherein the water collecting tray comprises a guide groove recessed from a lower surface of the water collecting tray, and the support member including the insertion protrusion which is inserted into the guide groove, and wherein water discharged from the first outlet flow path is guided with water discharged from the second outlet flow path and introduced into the third inlet flow path, a mounting member coupleable to one end of the first filter, the second filter, and the third filter; and a door bracket provided to cover another end of the first filter, the second filter, and the third filter, the door bracket comprising a door block formed to protrude from a wall of the door bracket provided to cover the another end of the first filter, the second filter, and the third filter, so as to face the another end of at least one of the first filter, the second filter, and the third filter in a position in which the first filter, the second filter, and the third filter are coupled to the mounting member, wherein the first filter, the second filter, and the third filter are covered by the door bracket in the position, and wherein the guide groove formed in a position corresponding to the door block which operates as a door guide to allow the door block to guide withdrawal of the water collecting tray.

2. The filter assembly of claim 1, wherein the pipe member further comprises a connection pipe to connect the first filter, the second filter, and the third filter.

3. The filter assembly of claim 2, wherein the connection pipe further comprises a plurality of confluence inlet pipes formed to extend between the second filter and the third filter to connect the first outlet flow path and the second outlet flow path.

4. The filter assembly of claim 3, wherein the connection pipe further comprises a confluence outlet pipe arranged among the plurality of confluence inlet pipes to discharge water that is guided in the plurality of confluence inlet pipes.

5. The filter assembly of claim 4, wherein the connection pipe further comprises an inclined pipe inclined at an angle from the confluence outlet pipe and formed to extend to have an inclination between the confluence outlet pipe and the third filter.

6. The filter assembly of claim 5, wherein the plurality of filters further comprises a fourth filter; and the pipe member further comprises a third outlet flow path to be connected to the third filter to move water discharged from the third filter.

7. The filter assembly of claim 6, wherein the pipe member further comprises a fourth outlet flow path to be connected to the fourth filter to move water discharged from the fourth filter.

8. The filter assembly of claim 1, wherein each of the first filter, the second filter and the third filter further comprise a plurality of check valves provided to prevent water leakage, an inlet provided to guide water introduced to a filter member, and an outlet provided to guide water discharged from the filter member, wherein the plurality of check valves comprises a first check valve and a second check valve, wherein the first check valve is arranged in the inlet, and the second check valve is arranged in the outlet.

9. The filter assembly of claim 1, wherein the first filter and the second filter comprise a composite filter of a same type.

10. The filter assembly of claim 1, wherein the first filter arranged in a position relative to a position of the second filter along a first direction; and the third filter is arranged in a position relative to a position of the first filter along a second direction perpendicular to the first direction, wherein the first outlet flow path is formed to extend along the second direction to guide water discharged from the first filter; and the second outlet flow path is formed to extend along the second direction to guide water discharged from the second filter, wherein the pipe member comprises:

at least one confluence inlet pipe formed to extend along the first direction between the second filter and the third filter to connect the first outlet flow path and the second outlet flow path; and a confluence outlet pipe through which water joined in the at least one confluence inlet pipe is discharged, wherein the third inlet flow path extends along the second direction between the at least one confluence inlet pipe and the third filter so as to guide water introduced into the third filter.

11. The filter assembly of claim 10, further comprising:

a fourth filter arranged in a position relative to the first filter along the second direction, wherein the pipe member further comprises a plurality of link pipes formed to extend along a third direction perpendicular to the first direction and the second direction between the third filter and the fourth filter, to guide water discharged from the third filter toward the fourth filter.

12. The filter assembly of claim 11, wherein the pipe member comprises a third outlet flow path to be connected to the plurality of link pipes and formed to extend along the first direction to guide the water discharged from the third filter.

13. A filter assembly comprising:

a first filter arranged in a position relative to a position of a second filter along a first direction;

a third filter arranged in a position relative to a position of the first filter along a second direction perpendicular to the first direction;

a pipe member to be connected to the first filter, the second filter, and the third filter;

an inner casing arranged outside the first filter, the second filter, and the third filter to fix the first filter, the second filter, and the third filter;

a residual water hole arranged on the inner casing;

a support member arranged under the inner casing and coupled to the inner casing; and a water collecting tray, slidable along the support member, to be introduced into an outer casing of the filter assembly between the inner casing and the support member and withdrawn from the outer casing, the water collecting tray being below the residual water hole such that residual water from the first filter, the second filter, and the third filter is discharged through the residual water hole and collected in the water collecting tray, wherein the water collecting tray comprises a guide groove recessed from a lower surface of the water collecting tray, and the support member comprises an insertion protrusion which is inserted into the guide groove, and wherein the pipe member comprises:

a first outlet flow path to be connected to the first filter and formed to extend along a third direction perpendicular to the first direction and the second direction to guide water discharged from the first filter;

a second outlet flow path to be connected to the second filter and formed to extend along the third direction to guide water discharged from the second filter;

a plurality of confluence inlet pipes formed to extend along the first direction between the first filter and the second filter to connect the first outlet flow path and the second outlet flow path;

a confluence outlet pipe arranged among the plurality of confluence inlet pipes to discharge water that is guided in the plurality of confluence inlet pipes; and a third inlet flow path formed to extend along the third direction between a confluence inlet pipe and the third filter to guide water introduced into the third filter, a mounting member coupleable to one end of the first filter, the second filter, and the third filter; and a door bracket provided to cover another end of the first filter, the second filter, and the third filter, the door bracket comprising a door block formed to protrude from a wall of the door bracket provided to cover the another end of the first filter, the second filter, and the third filter, so as to face the another end of at least one of the first filter, the second filter, and the third filter in a position in which the first filter, the second filter, and the third filter are coupled to the mounting member, wherein the first filter, the second filter, and the third filter are covered by the door bracket in the position, and wherein the guide groove formed in a position corresponding to the door block which operates as a door guide to allow the door block to guide withdrawal of the water collecting tray.

14. The filter assembly of claim 13, wherein the pipe member comprises a bent pipe formed to extend to be bent from the first direction to the second direction between the confluence outlet pipe and the third filter so as to guide the water discharged from the confluence outlet pipe to the third filter.

* * * * *